United States Patent
Choi et al.

(10) Patent No.: US 12,154,499 B2
(45) Date of Patent: Nov. 26, 2024

(54) SIGNAL PROCESSING DEVICE AND IMAGE DISPLAY APPARATUS INCLUDING THE SAME

(71) Applicant: LG ELECTRONICS INC., Seoul (KR)

(72) Inventors: Yunjun Choi, Seoul (KR); Jongchan Kim, Seoul (KR); Kyeongryeol Park, Seoul (KR); Jeonghyu Yang, Seoul (KR); Seungjong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/773,358

(22) PCT Filed: Oct. 31, 2019

(86) PCT No.: PCT/KR2019/014579
§ 371 (c)(1),
(2) Date: Apr. 29, 2022

(87) PCT Pub. No.: WO2021/085679
PCT Pub. Date: May 6, 2021

(65) Prior Publication Data
US 2024/0153451 A1    May 9, 2024

(51) Int. Cl.
*G09G 3/3233*    (2016.01)

(52) U.S. Cl.
CPC ... *G09G 3/3233* (2013.01); *G09G 2320/0233* (2013.01); *G09G 2320/0257* (2013.01)

(58) Field of Classification Search
CPC .................................................. G09G 3/3233
See application file for complete search history.

(56) References Cited

U.S. PATENT DOCUMENTS

| | | |
|---|---|---|
| 2007/0097038 A1 | 5/2007 | Yamazaki et al. |
| 2019/0057652 A1 | 2/2019 | Lee |
| 2019/0156746 A1 | 5/2019 | Kim et al. |
| 2020/0074596 A1* | 3/2020 | Chun ........................ G09G 5/10 |
| 2021/0210045 A1* | 7/2021 | Huang ................. G09G 3/3685 |
| 2021/0210517 A1 | 7/2021 | Kawashima et al. |
| 2022/0114986 A1* | 4/2022 | Lee ......................... G09G 3/20 |

FOREIGN PATENT DOCUMENTS

| | | |
|---|---|---|
| JP | 2019-95790 A | 6/2019 |
| KR | 10-2016-0092335 A | 8/2016 |
| KR | 10-2018-0013189 A | 2/2018 |
| KR | 10-2019-0019438 A | 2/2019 |

* cited by examiner

*Primary Examiner* — Chun-Nan Lin
(74) *Attorney, Agent, or Firm* — Birch, Stewart, Kolasch & Birch, LLP

(57) ABSTRACT

A signal processing device and an image display apparatus including the same are disclosed. A signal processing device and an image display apparatus including the same according to an embodiment of the present disclosure includes: an afterimage analyzer to calculate image accumulation information based on an input image, an afterimage learning processor to perform learning based on the image accumulation information and adjust an afterimage reducing strength based on the learning, and an afterimage reducing processor to perform an afterimage reducing process based on the afterimage reducing strength from the afterimage learning processor. Accordingly, an afterimage of the image display apparatus including the organic light emitting diode panel may be reduced.

16 Claims, 20 Drawing Sheets

(a)          (b)          (c)

SIGNAL PROCESSING DEVICE AND IMAGE DISPLAY APPARATUS INCLUDING THE SAME

CROSS REFERENCE TO RELATED APPLICATIONS

This application is the National Stage filing under 35 U.S.C. 371 of International Application No. PCT/KR2019/014579, filed on Oct. 31, 2019, which is hereby expressly incorporated by reference into the present application.

BACKGROUND OF THE DISCLOSURE

1. Field of the Disclosure

The present disclosure relates to an image display apparatus, and more particularly, to a signal processing device and an image display apparatus including the same capable of reducing an afterimage of an image display apparatus including an organic light emitting diode panel.

2. Description of the Related Art

A signal processing device is a device that is included in an image display apparatus and performs signal processing on an input image so as to display an image.

For example, the signal processing device may receive a broadcast signal or an HDMI signal, performs signal processing based on the received broadcast or HDMI signal, and output a processed image signal.

The image display apparatus is a device having a function of providing an image that a user watches. The user may watch various images through the image display apparatus.

In particular, the image display apparatus may display a broadcast image. The image display apparatus may provide broadcasting selected by the user from a broadcast signal transmitted from a broadcast station and may display such a broadcast image on a display.

The image display apparatus may include various types of panels and may display an image. Recently, an organic light emitting diode panel having a rapid response speed and vivid image quality has been increasingly employed by an image display apparatus.

Due to device characteristics, a burn-in phenomenon occurs in the organic light emitting diode panel. In particular, when a specific region in an image is repeatedly displayed, burn-in whereby a portion of a light emitting diode which corresponds to the corresponding region may easily occur. Accordingly, an afterimage occurs.

For example, when a broadcasting image is displayed, the possibility that burn-in occurs at a position of a broadcast station name, a program title, or the like of a channel is increased. Thus, research has been conducted into various methods for reducing burn-in.

SUMMARY

Therefore, the present disclosure has been made in view of the above problems, and it is an object of the present disclosure to provide an image display apparatus capable of reducing an afterimage of an image display apparatus including an organic light emitting diode panel.

It is another object of the present disclosure to provide an image display apparatus capable of increasing the lifespan of an image display apparatus including an organic light emitting diode panel.

In accordance with the present disclosure, a signal processing device and an image display apparatus including the same according to an embodiment of the present disclosure includes: an afterimage analyzer to calculate image accumulation information based on an input image, an afterimage learning processor to perform learning based on the image accumulation information and adjust an afterimage reducing strength based on the learning, and an afterimage reducing processor to perform an afterimage reducing process based on the afterimage reducing strength from the afterimage learning processor.

Meanwhile, the signal processing device and an image display apparatus including the same according to an embodiment of the present disclosure may further include an afterimage reducing level setter to set an afterimage reducing level based on the afterimage reducing strength from the afterimage learning processor.

Meanwhile, the afterimage reducing processor may perform the afterimage reducing process based on the afterimage reducing level from the afterimage reducing level setter.

Meanwhile, the afterimage learning processor may increase the afterimage reducing strength from a first level to a second level based on the image accumulation information being a reference size or greater.

Meanwhile, the afterimage learning processor may further adjust the afterimage reducing strength based on a frequency of image accumulation.

Meanwhile, the afterimage learning processor may increase the afterimage reducing strength from a first level to a third level based on the frequency of the image accumulation being a first time or more.

Meanwhile, the afterimage learning processor may control to store the image accumulation information or the afterimage reducing strength in an external nonvolatile memory.

Meanwhile, in response to the power being turned on, the afterimage learning processor may receive the image accumulation information or the afterimage reducing strength from the external nonvolatile memory, and in response to the power being turned off, the afterimage learning processor may transmit the image accumulation information or the afterimage reducing strength to the external nonvolatile memory.

Meanwhile, the afterimage learning processor may perform learning based on the image accumulation information based on a deep neural network and adjust the afterimage reducing strength based on the learning.

Meanwhile, the afterimage learning processor may reset the image accumulation information or control a level of the image accumulation information to be a predetermined value or less based on the afterimage processing operation being performed in the afterimage reducing processor.

Meanwhile, the afterimage analyzer may accumulate at least one of a pixel current, a brightness level, or a saturation level based on the input image.

Meanwhile, the afterimage reducing processor may output a second brightness level lower than a first brightness level, which is an input brightness, for a region for which the afterimage reducing process is required, based on a first afterimage reducing strength.

Meanwhile, the afterimage reducing processor may output a third brightness level lower than the first brightness level, which is an input brightness, and lower than the second brightness level for a region for which the afterimage reducing process is required, based on a second afterimage reducing strength higher than the first afterimage reducing strength.

Meanwhile, the afterimage analyzer, the afterimage learning processor, and the afterimage reducing processor may be operated in a frame unit.

Meanwhile, the afterimage analyzer, the afterimage learning processor, and the afterimage reducing processor may be operated in a pixel unit or a predefined region unit.

Meanwhile, the signal processing device and an image display apparatus including the same according to an embodiment of the present disclosure may further include a second afterimage analyzer to calculate image accumulation information based on an input image, a second afterimage learning processor to perform learning based on the image accumulation information and adjust an afterimage reducing strength based on learning, and a second afterimage reducing processor to perform an afterimage reducing process based on the afterimage reducing strength from the afterimage learning processor.

Meanwhile, the image display apparatus according to an embodiment of the present disclosure may further include a nonvolatile memory configured to store the image accumulation information or the afterimage reducing strength.

Effects of the Disclosure

A signal processing device and an image display apparatus including the same according to an embodiment of the present disclosure includes: an afterimage analyzer to calculate image accumulation information based on an input image, an afterimage learning processor to perform learning based on the image accumulation information and adjust an afterimage reducing strength based on the learning, and an afterimage reducing processor to perform an afterimage reducing process based on the afterimage reducing strength from the afterimage learning processor. Accordingly, an afterimage of the image display apparatus including the organic light emitting diode panel may be reduced. Furthermore, the lifespan of the image display apparatus including an organic light emitting diode panel may be increased.

Meanwhile, the signal processing device and an image display apparatus including the same according to an embodiment of the present disclosure may further include an afterimage reducing level setter to set an afterimage reducing level based on the afterimage reducing strength from the afterimage learning processor. Accordingly, an afterimage of the image display apparatus including the organic light emitting diode panel may be reduced.

Meanwhile, the afterimage reducing processor may perform the afterimage reducing process based on the afterimage reducing level from the afterimage reducing level setter. Accordingly, an afterimage of the image display apparatus including the organic light emitting diode panel may be reduced, and consequently, the lifespan of the image display apparatus may be increased.

Meanwhile, the afterimage learning processor may increase the afterimage reducing strength from a first level to a second level based on the image accumulation information being a reference size or greater. Accordingly, an afterimage of the image display apparatus including the organic light emitting diode panel may be efficiently reduced.

Meanwhile, the afterimage learning processor may further adjust the afterimage reducing strength based on a frequency of image accumulation. Accordingly, an afterimage of the image display apparatus including the organic light emitting diode panel may be efficiently reduced.

Meanwhile, the afterimage learning processor may increase the afterimage reducing strength from a first level to a third level based on the frequency of the image accumulation being a first time or more. Accordingly, an afterimage of the image display apparatus including the organic light emitting diode panel may be efficiently reduced.

Meanwhile, the afterimage learning processor may control to store the image accumulation information or the afterimage reducing strength in an external nonvolatile memory. Accordingly, the image accumulation information or the afterimage reducing strength may be stably managed.

Meanwhile, in response to the power being turned on, the afterimage learning processor may receive the image accumulation information or the afterimage reducing strength from the external nonvolatile memory, and in response to the power being turned off, the afterimage learning processor may transmit the image accumulation information or the afterimage reducing strength to the external nonvolatile memory. Accordingly, the image accumulation information or the afterimage reducing strength may be stably managed and may be calculated accurately.

Meanwhile, the afterimage learning processor may perform learning based on the image accumulation information based on a deep neural network and adjust the afterimage reducing strength based on the learning. Accordingly, an afterimage of the image display apparatus including the organic light emitting diode panel may be efficiently reduced.

Meanwhile, the afterimage learning processor may reset the image accumulation information or control a level of the image accumulation information to be a predetermined value or less based on the afterimage processing operation being performed in the afterimage reducing processor. Accordingly, an afterimage of the image display apparatus including the organic light emitting diode panel may be efficiently reduced.

Meanwhile, the afterimage analyzer may accumulate at least one of a pixel current, a brightness level, or a saturation level based on the input image. Accordingly, various types of image accumulation information may be calculated, and an afterimage of the image display apparatus may be efficiently reduced.

Meanwhile, the afterimage reducing processor may output a second brightness level lower than a first brightness level, which is an input brightness, for a region for which the afterimage reducing process is required, based on a first afterimage reducing strength. Accordingly, an afterimage of the image display apparatus including the organic light emitting diode panel may be efficiently reduced.

Meanwhile, the afterimage reducing processor may output a third brightness level lower than the first brightness level, which is an input brightness, and lower than the second brightness level for a region for which the afterimage reducing process is required, based on a second afterimage reducing strength higher than the first afterimage reducing strength. Accordingly, an afterimage of the image display apparatus including the organic light emitting diode panel may be efficiently reduced.

Meanwhile, the afterimage analyzer, the afterimage learning processor, and the afterimage reducing processor may be operated in a frame unit. Accordingly, an afterimage of the image display apparatus including the organic light emitting diode panel may be efficiently reduced.

Meanwhile, the afterimage analyzer, the afterimage learning processor, and the afterimage reducing processor may be operated in a pixel unit or a predefined region unit. Accordingly, an afterimage of the image display apparatus including the organic light emitting diode panel may be efficiently reduced.

Meanwhile, the signal processing device and an image display apparatus including the same according to an embodiment of the present disclosure may further include a second afterimage analyzer to calculate image accumulation information based on an input image, a second afterimage learning processor to perform learning based on the image accumulation information and adjust an afterimage reducing strength based on learning, and a second afterimage reducing processor to perform an afterimage reducing process based on the afterimage reducing strength from the afterimage learning processor. Accordingly, an afterimage of the image display apparatus including the organic light emitting diode panel may be efficiently reduced.

Meanwhile, the image display apparatus according to an embodiment of the present disclosure may further include a nonvolatile memory configured to store the image accumulation information or the afterimage reducing strength. Accordingly, the image accumulation information or the afterimage reducing strength may be stably managed and may be calculated accurately.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
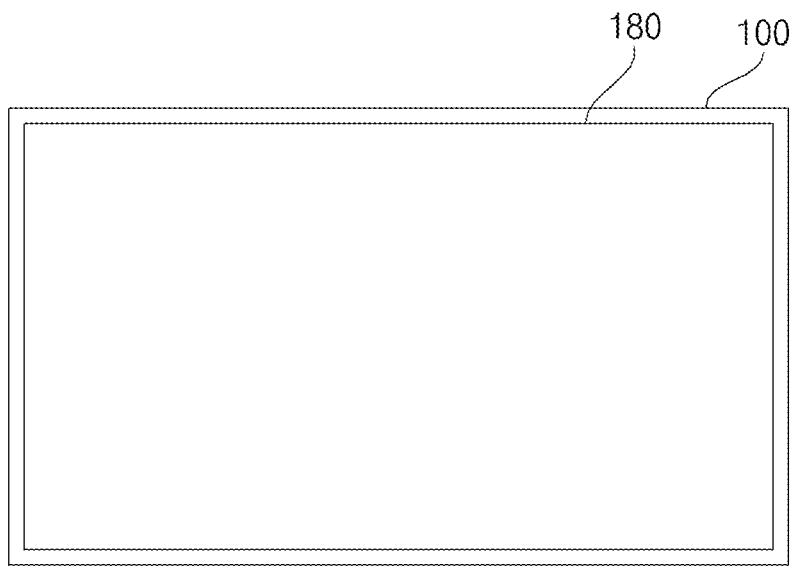
FIG. 1 is a diagram showing an image display system according to an embodiment of the present disclosure.

FIG. 1 is a diagram showing an image display apparatus according to an embodiment of the present disclosure.

Referring to the drawing, an image display apparatus 100 may include a display 180.

The display 180 may be implemented with any one of various panels. For example, the display 180 may be any one of a liquid crystal display panel (LCD panel), an organic light emitting diode panel (OLED panel), an inorganic light emitting diode panel (LED panel).

In the present disclosure, an example in which the display 180 includes the organic light emitting diode panel (OLED panel) is mainly described.

Meanwhile, the OLED panel exhibits a faster response speed than the LED and is excellent in color reproduction.

The present disclosure may propose a method of reducing an afterimage of an image display apparatus by reducing burn-in that may occur in an organic light emitting diode (OLED) panel included in the display 180.

In particular, the present disclosure may propose a method of increasing the lifespan of an organic light emitting diode (OLED) panel while reducing an afterimage of an image display apparatus.

A signal processing device 170 and the image display apparatus 100 including the same according to an embodiment of the present disclosure may include an afterimage analyzer 950 to calculate image accumulation information based on an input image, an afterimage learning processor 980 to perform learning based on the image accumulation information and adjust an afterimage reducing strength based on learning, and an afterimage reducing processor 970 to perform an afterimage reducing process based on the afterimage reducing strength from the afterimage learning processor 980. Accordingly, an afterimage of the image display apparatus 100 including the organic light emitting diode panel 210 may be reduced. Furthermore, the lifespan of the image display apparatus 100 including an organic light emitting diode panel 210 may be increased.

Meanwhile, the signal processing device 170 and the image display apparatus 100 including the same according to an embodiment of the present disclosure may further include an afterimage reducing level setter 960 to set an afterimage reducing level based on the afterimage reducing strength from the afterimage learning processor 980. Accordingly, an afterimage of the image display apparatus 100 including the organic light emitting diode panel 210 may be reduced.

Meanwhile, the afterimage reducing processor 970 may perform the afterimage reducing process based on the afterimage reducing level from the afterimage reducing level setter 960. Accordingly, an afterimage of the image display apparatus 100 including the organic light emitting diode panel 210 may be reduced, and consequently, the lifespan of the image display apparatus 100 may be increased.

Various operating methods of the aforementioned image display apparatus 100 will be described in more detail with reference to FIG. 12a and subsequent drawings thereof.

Meanwhile, the image display apparatus 100 in FIG. 1 may be a monitor, a TV, a tablet PC, a mobile terminal, a display for a vehicle, etc.

Figure 2:
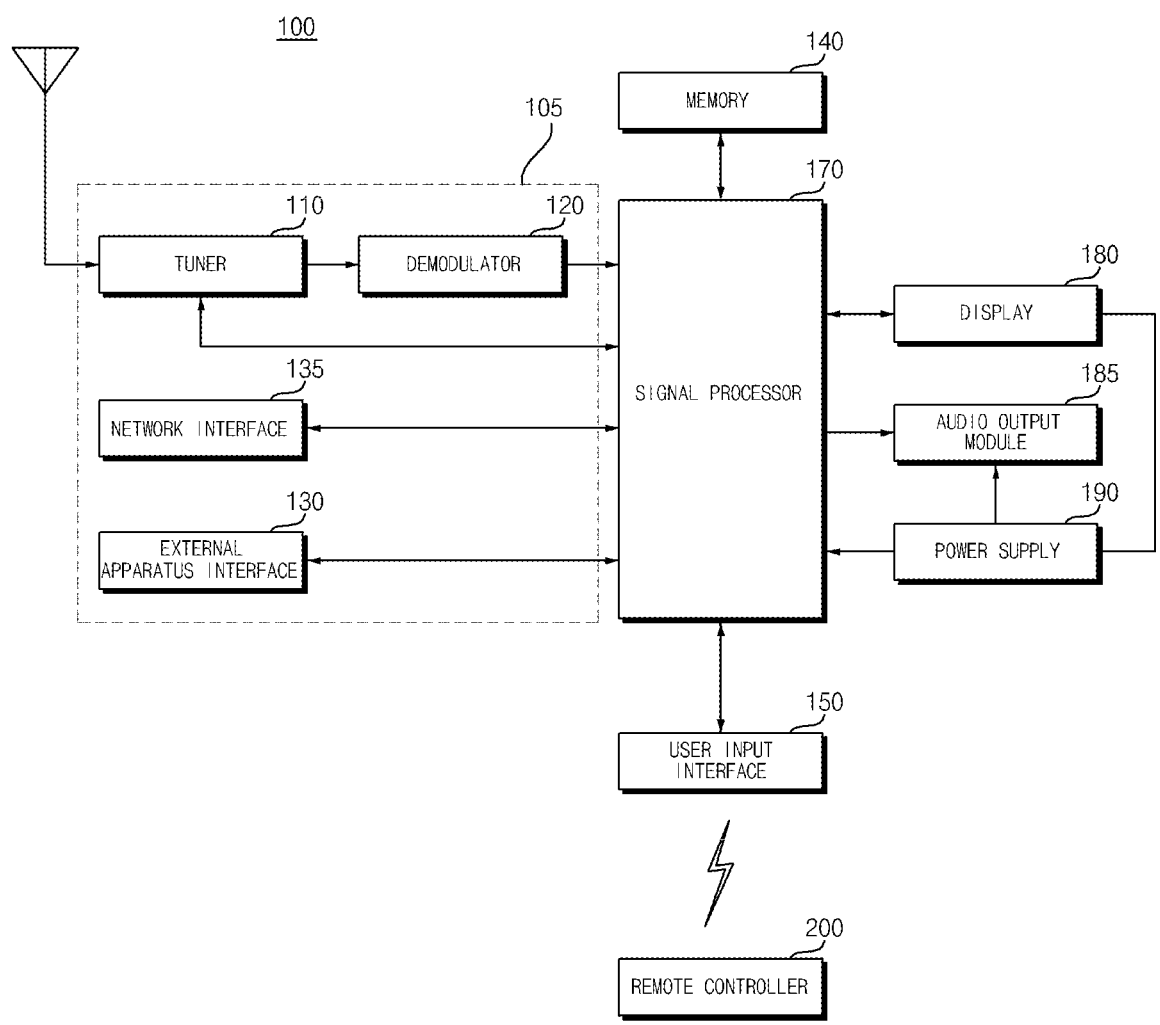
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processor 170, a display 180, and an audio output device 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all prestored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processor 170.

Meanwhile, the tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a settop box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a settop box, and may perform an input/output operation with an external apparatus.

The A/V input and output device may receive image and audio signals from an external apparatus. Meanwhile, a wireless transceiver (not shown) may perform short range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processor 170, and may store signal processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 is configured to receive a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power. The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
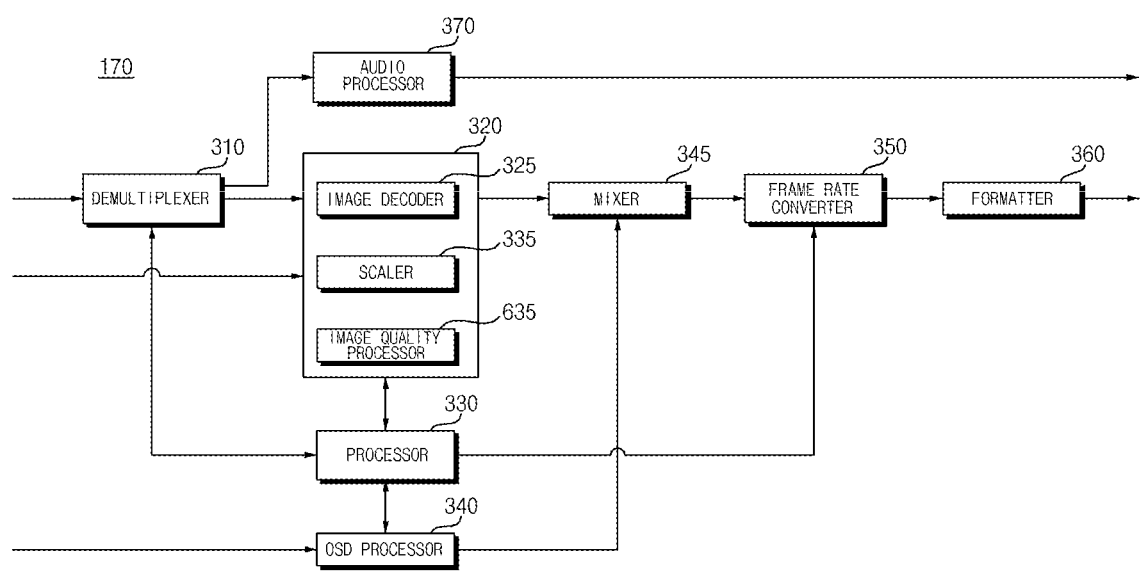
FIG. 3 is an example of an internal block diagram of the signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform signal processing based on high dynamic range (HDR), change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

A frame rate converter (FRC) 350 may convert a frame rate of an input image. The FRC 350 may output the input image without changes.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
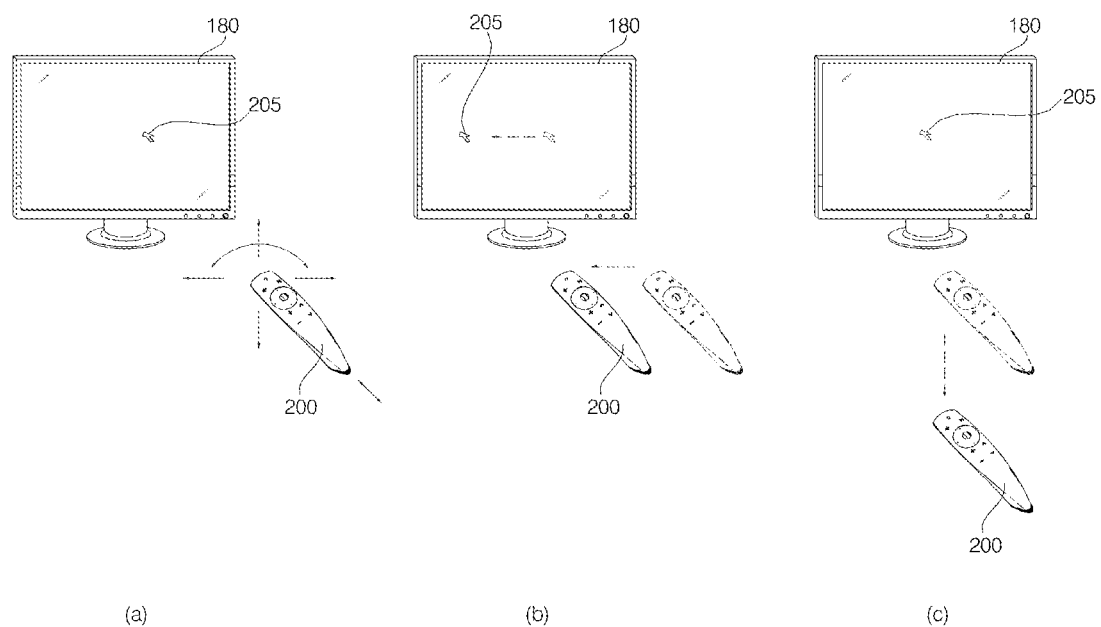
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
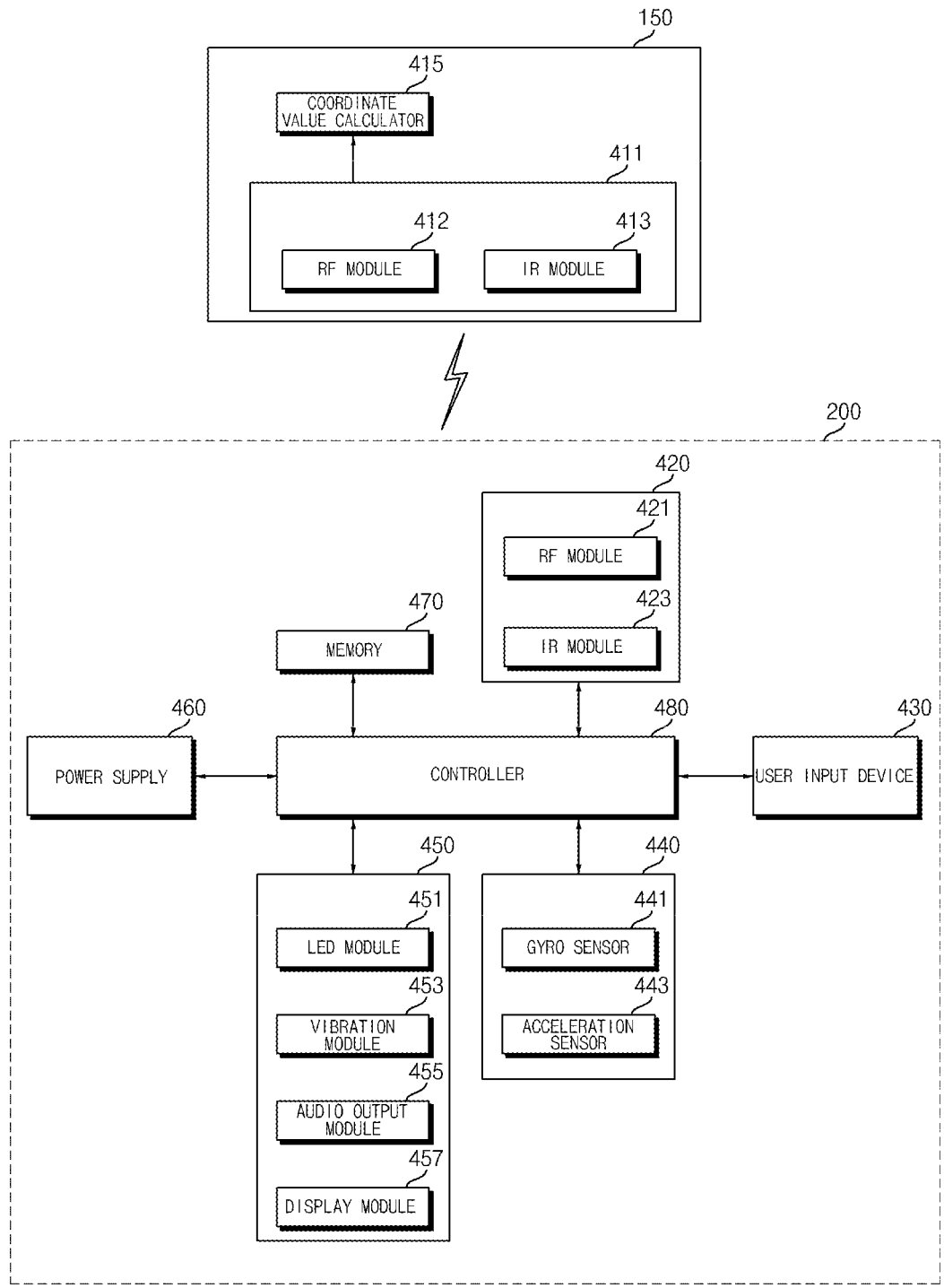
FIG. 4B is an internal block diagram of the remote controller of FIG. 2.

FIG. 4B is an internal block diagram of the remote controller of FIG. 2.

Referring to the drawing, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output device 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless transceiver 151 and may calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

Figure 5:
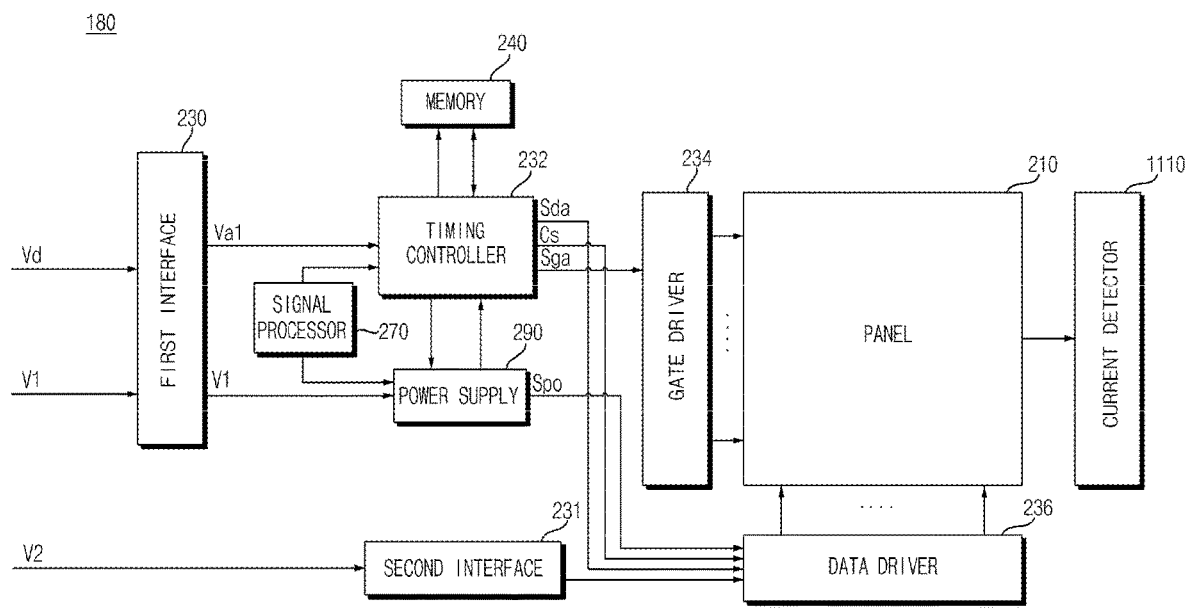
FIG. 5 is an internal block diagram of a display of FIG. 2.

FIG. 5 is an internal block diagram of a display of FIG. 2.

Referring to FIG. 5, the organic display 180 including light emitting diode panel may include an organic light emitting diode panel 210, a first interface 230, a second interface 231, a timing controller 232, a gate driver 234, a data driver 236, a memory 240, a signal processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

A current detector 1110 may detect the current flowing in a subpixel of the organic light emitting diode panel 210. The detected current may be input to the processor 270 or the like, for a accumulated current calculation.

The signal processor 270 may perform each type of control of the display 180. For example, the processor 270 may control the gate driver 234, the data driver 236, the timing controller 232, and the like.

Meanwhile, the signal processor 270 may receive current information flowing in a subpixel of the organic light emitting diode panel 210 from the current detector 510.

In addition, the signal processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the signal processor 270 may determine as burn-in, if the accumulated current of each subpixel of the organic light emitting diode panel 210 is equal to or greater than an allowable value.

For example, if the accumulated current of each subpixel of the OLED panel 210 is equal to or higher than 300,000 A, the signal processor 270 may determine that a corresponding subpixel is a burn-in subpixel.

Meanwhile, if the accumulated current of each subpixel of the OLED panel 210 is close to an allowable value, the signal processor 270 may determine that a corresponding subpixel is a subpixel expected to be burn in.

Meanwhile, based on a current detected by the current detector 510, the signal processor 270 may determine that a subpixel having the greatest accumulated current is an expected burn-in subpixel.

Meanwhile, the signal processor 270 may calculate a burn-in subpixel or a burn-in expected subpixel in the organic light emitting diode panel 210 based on current detected by the current detector 1110 and may perform control to allow a current lower than the allocated current to flow in a subpixel around the calculated burn-in subpixel or burn-in expected subpixel. Thus, burn-in of the subpixel around the burn-in subpixel may be extended. As a result, the afterimage of the image display apparatus 100 including the organic light emitting diode panel 210 may be reduced.

The signal processor 270 may perform control to allow a current larger than the allocated current to flow in the calculated burn-in subpixel, and thus, thereby preventing a phenomenon in which a small current flows around the calculated burn-in subpixel and brightness decreases.

When burn-in does not occur in the organic light emitting diode panel 210, the signal processor 270 may perform control to allow a current lower than the allocated current to flow in the subpixel around the burn-in expected subpixel, in which burn-in is expected, and thus, burn-in of the subpixel around the burn-in expected subpixel may be extended. As a result, the afterimage of the image display apparatus 100 including the organic light emitting diode panel 210 may be reduced.

The signal processor 270 may perform control to apply a lower data voltage than an allocated data voltage to the subpixel of the calculated burn-in subpixel or burn-in expected subpixel.

When burn-in does not occur in the organic light emitting diode panel 210, the signal processor 270 may perform control to allow a current lower than the allocated current to flow in the subpixel around the burn-in expected subpixel, in which burn-in is expected, and thus, burn-in of the subpixel around the burn-in expected subpixel may be extended. As a result, the afterimage of the image display apparatus 100 including the organic light emitting diode panel 210 may be reduced.

The signal processor 270 may perform control to allow current of a higher second level than a first level to flow in the subpixel around the calculated burn-in subpixel or burn-in expected subpixel, and thus, a larger amount of current may flow in the second subpixel, the lifespan of which is expected to be relatively long, thereby preventing brightness from being lowered.

The signal processor 270 may calculate a subpixel with the largest amount of accumulated current in the organic light emitting diode panel 210 based on current detected by the current detector 1110 and may perform control to allow a current lower than the allocated current to flow in a subpixel around the subpixel with the largest amount of accumulated current. Thus, the afterimage of the image display apparatus 100 including the organic light emitting diode panel 210 may be reduced.

The signal processor 270 may perform control to allow current of a further lowered level to flow in a subpixel around the subpixel with the largest amount of accumulated current toward the subpixel with the largest amount of accumulated current, and thus, the afterimage of the image display apparatus 100 including the organic light emitting diode panel 210 may be reduced.

An operation of the signal processor 270 or the like will be described in more detail with reference to FIG. 9 and subsequent drawings thereof.

Figure 6A:
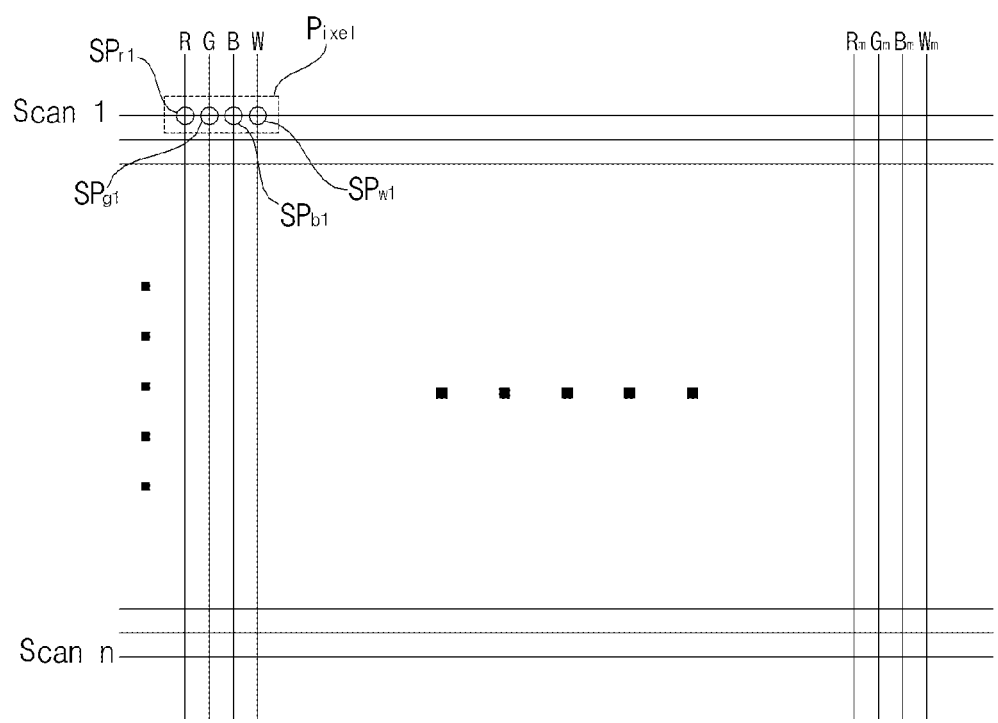
FIG. 6A and FIG. 6B are diagrams referred to in the description of an organic light emitting diode panel of FIG. 5.
Figure 6B:
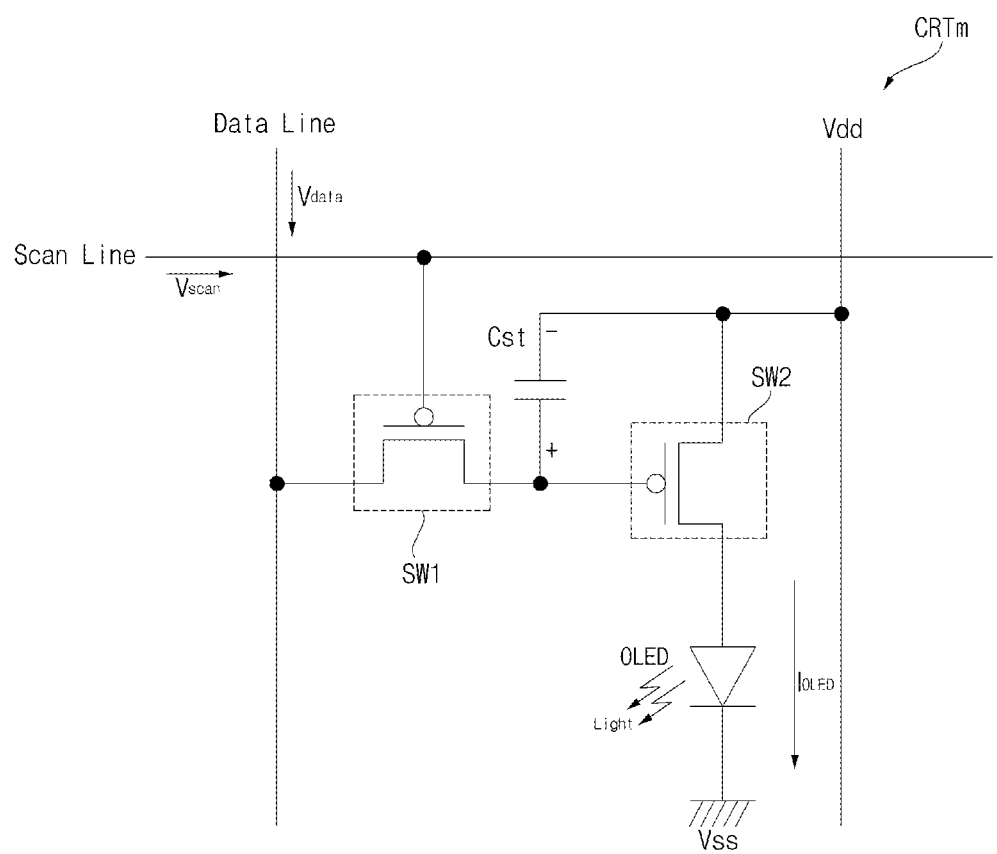

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to $R_m$, $G_m$, $B_m$, $W_m$ intersecting the scan lines.

Meanwhile, a pixel (subpixel) is defined in an intersecting area of the scan line and the data line in the organic light emitting diode panel 210. In the drawing, a pixel including subpixels SR1, SG1, SB1 and SW1 of RGBW is shown.

FIG. 6B illustrates a circuit of any one subpixel in the pixel of the organic light emitting diode panel of FIG. 6A.

Referring to drawing, an organic light emitting sub pixel circuit (CRTm) may include, as an active type, a switching transistor SW1, a storage capacitor Cst, a drive transistor SW2, and an organic light emitting layer (OLED).

The switching transistor SW1 is turned on according to the input scan signal Vdscan, as a scan line is connected to a gate terminal. When it is turned on, the input data signal $V_{data}$ is transferred to the gate terminal of the drive transistor SW2 or one end of the storage capacitor Cst.

The storage capacitor Cst is formed between the gate terminal and the source terminal of the drive transistor SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal $V_{data}$.

For another example, when the data signal has a different pulse width according to a Pluse Width Modulation (PWM) method, the power level stored in the storage capacitor Cst varies according to the pulse width difference of the data signal $V_{data}$.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), or an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for the switching transistor SW1 and the drive transistor SW2, but an n-type MOSFET or other switching element such as a JFET, IGBT, SIC, or the like are also available.

Meanwhile, the pixel is a hold type element that continuously emits light in the organic light emitting layer (OLED), after a scan signal is applied, during a unit display period, specifically, during a unit frame.

As current flows in the organic light emitting layer (OLED) arranged in each subpixel shown in FIG. 6B, light may be mitted, but burn-in may occur due to accumulated current. Burn-in will be described with reference to FIGS. 7A to 8B.

FIGS. 7A to 8B are diagrams for explaining burn-in in an image display apparatus included in an organic light emitting diode panel.

Figure 7A:
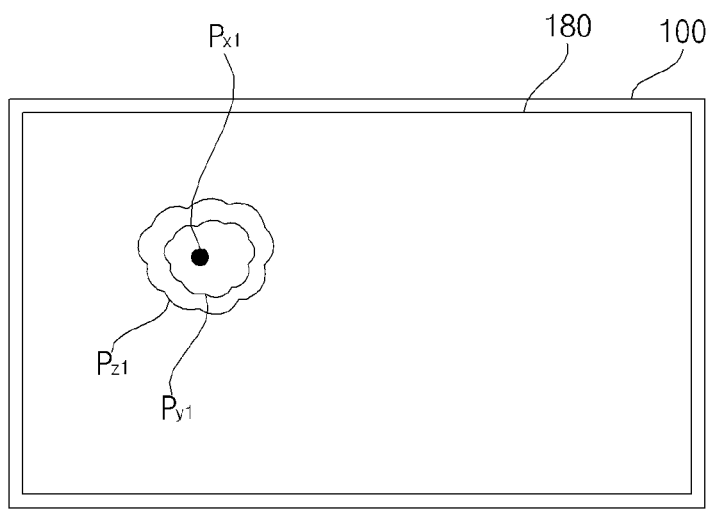
FIGS. 7A to 8B are diagrams for explaining burn-in in an image display apparatus included in an organic light emitting diode panel.

First, referring to FIG. 7A, when accumulated current flowing in a first point $P_{x1}$ of the display 180 of the image display apparatus 100 is equal to or greater than an allowable value, as described above, burn-in may occur due to consumption of the organic light emitting layer (OLED).

The possibility of burn-in in a second pixel Oy1 and a third region $P_{z1}$ which are around the first point $P_{x1}$ may also high.

Figure 7B:
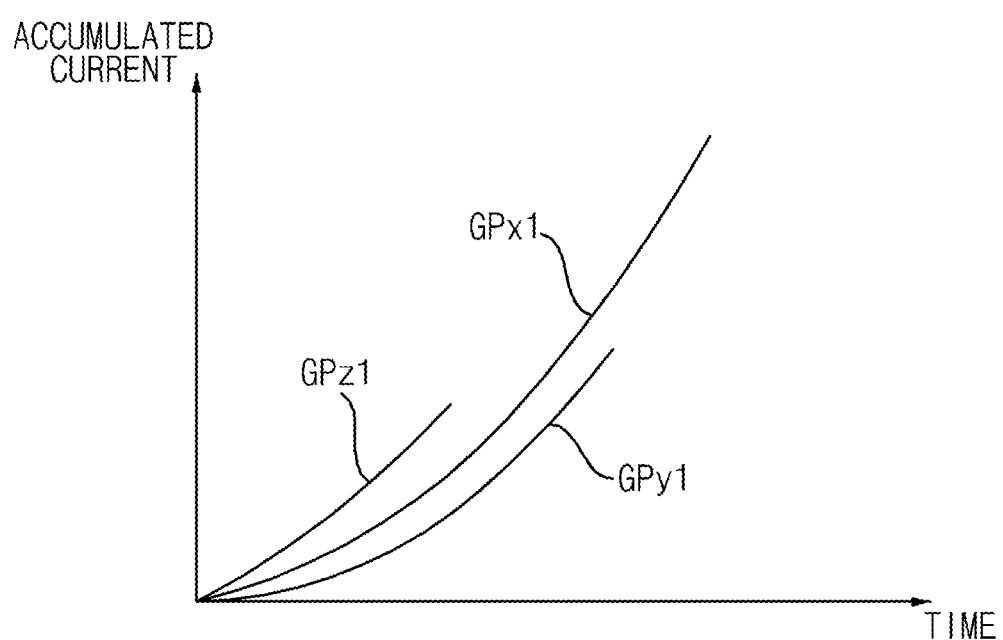

FIG. 7B shows a graph of accumulated current plots GPx1, GPy1, □and GPz1 for the first point $P_{x1}$, the second pixel Oy1, and the third region $P_{z1}$, respectively.

Figure 8A:
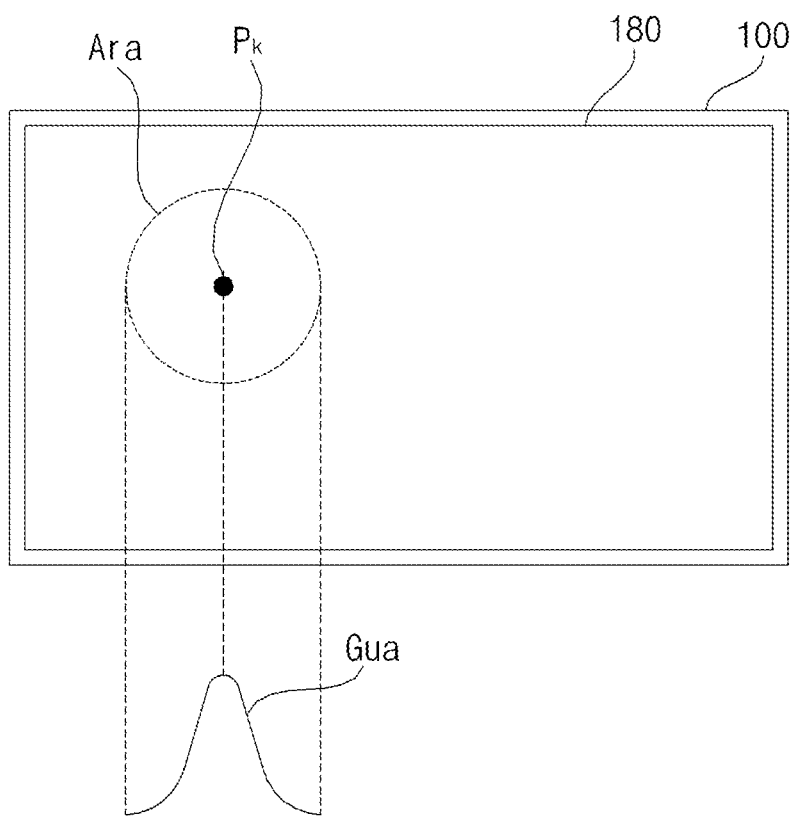

FIG. 8A shows burn-in possibility of Gaussian distribution with respect to area Ara including a burn-in point $P_k$.

Figure 8B:
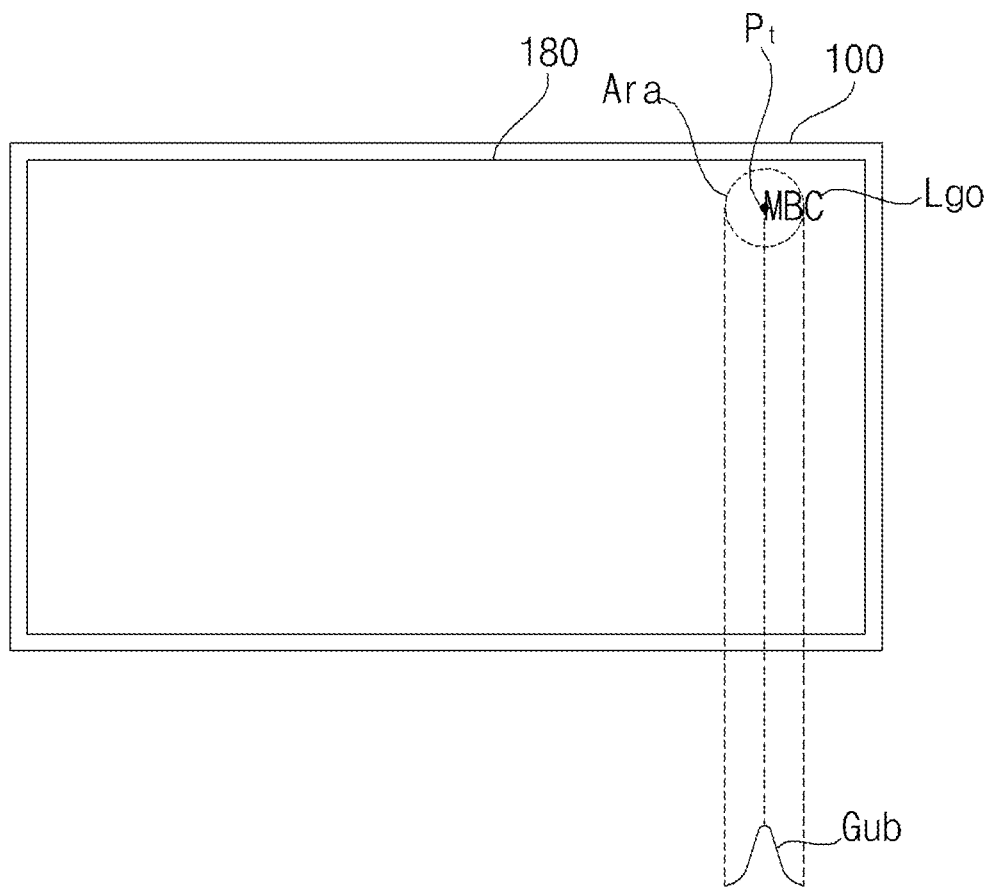

FIG. 8B shows burn-in possibility of Gaussian distribution with respect to area Ara including a burn-in point Pt at which a logo is indicated.

As shown in FIGS. 8A and 8B, burn-in possibility has Gaussian distribution based on a burn-in point, and thus, the present disclosure proposes a method of increasing the lifespan of an organic light emitting diode panel by lowering burn-in possibility around a burn-in point, which will be described with reference to FIG. 9, etc.

Figure 9:
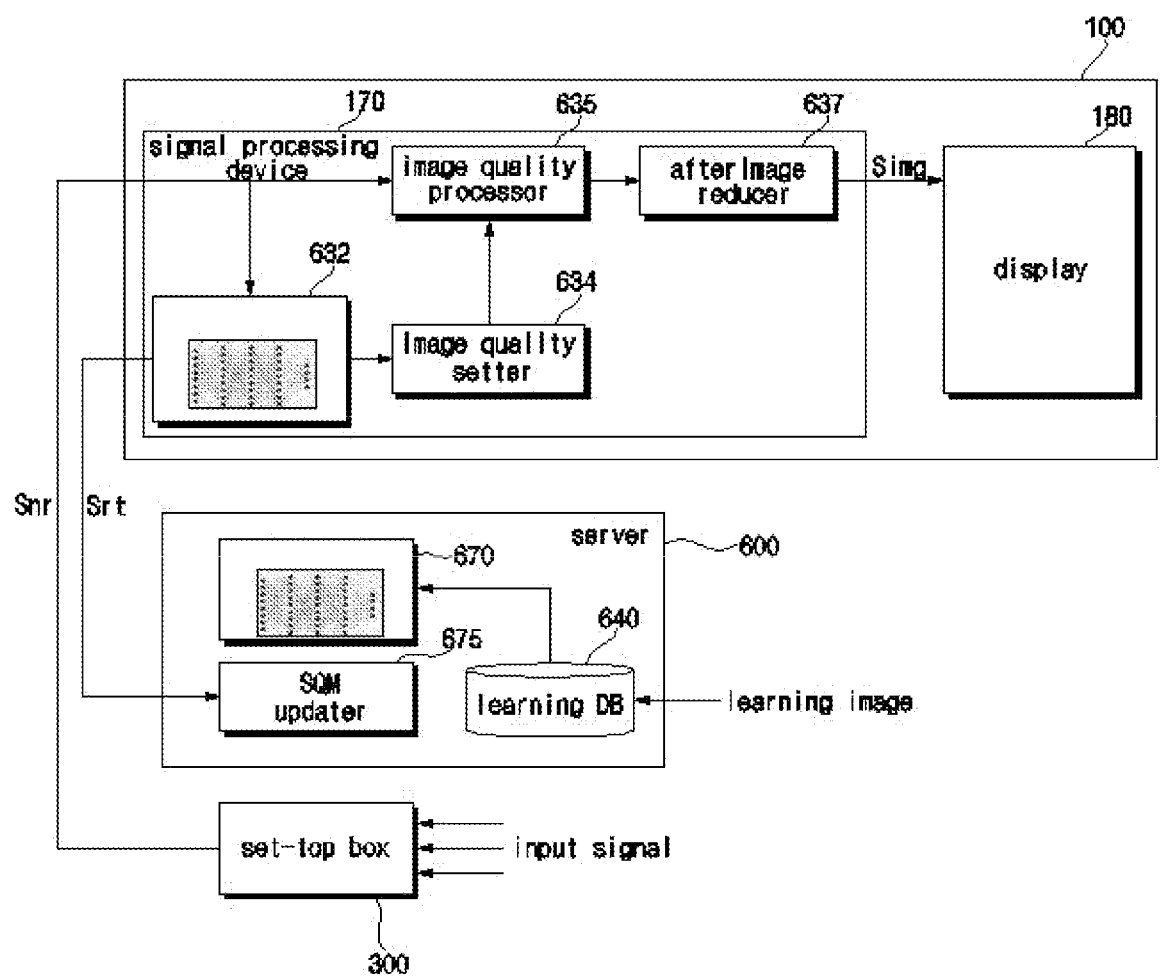
FIG. 9 is an internal diagram illustrating an example of an image display apparatus according to an embodiment of the present disclosure.

FIG. 9 is an internal diagram illustrating an example of an image display apparatus according to an embodiment of the present disclosure.

Referring to the drawing, an image display system 10 may include the image display apparatus 100, a server 600, and a set-top box 300.

The server 600 may be provided with a learning DB 640 for receiving a learning image and storing the learning image, a quality calculator 670 to calculate an image source quality by using the learning image from the learning DB 640 and the deep neural network, and a parameter updater 675 for updating a parameter for the deep neural network based on the learning DB 640 and the quality calculator 670.

The parameter updater 675 may transmit the updated parameter to a quality calculator 632 in the image display apparatus 100.

The set-top box 300 may receive an input signal provided by an image provider and transmit the image signal to an HDMI terminal of the image display apparatus 100.

The image display apparatus 100 may include an image receiver 105 for receiving an image signal through the external set-top box 300 or a network, a signal processor 170 to perform a signal processing for the image signal received from the image receiver 105, and a display 180 for displaying the image processed in the signal processor 170.

The image display apparatus 100 may apply an optimal tunning according to the image quality of the input image.

Meanwhile, the image display apparatus 100 may distinguish an original image resolution, a noise level, a compression level, and an enhancement level by analyzing the input image in real-time.

The image display apparatus 100 may change an image quality setting without sense of incompatibility based on the calculated image information data.

The signal processor 170 may include the quality calculator 632 to calculate an original image quality of an image signal received through the external set-top box 300 or a network, an image quality setter 634 to set an image quality of the image signal according to the calculated original image quality, an image quality processor 635 to perform an image processing of the image signal according to the configured image quality, and an afterimage reducer 637 to perform an afterimage reducing process.

When the original image quality of the received image signal is changed at a first timing, the image quality setter 634 varies the image quality settings from a first settings to a second settings sequentially, and the image quality processor 635 performs an image processing according to the image quality settings sequentially changed from the first settings to the second settings. Accordingly, when an image quality is changed according to the original image quality change of the received image signal, a flicker phenomenon may be reduced. Particularly, since an abrupt image quality change is not performed when the original image quality of the image signal is changed, a smooth image quality change becomes available.

Meanwhile, while an image is displayed, when the original image quality of the received image signal is changed at a first timing, the image quality setter 634 may change the image quality settings from a first settings to a second settings sequentially. Accordingly, when the original image quality of the received image signal is changed, the image quality settings may be changed in real-time. Particularly, since an abrupt image quality change is not performed when the original image quality of the image signal is changed, a smooth image quality change becomes available.

In the state that an image signal is received from the set-top box 300, when the original image quality of the received image signal is changed at a first timing according to a channel change or an input change, the image quality setter 634 may change the image quality settings from a first settings to a second settings sequentially. Accordingly, when an image quality is changed according to the original image quality change of the received image signal, a flicker phenomenon may be reduced. Particularly, since an abrupt image quality change is not performed when the original image quality of the image signal is changed, a smooth image quality change becomes available.

The quality calculator 632 may classify an input image into UHD (higher than 3840×2160), FHD (1920×1080), HD (1280×720), SD (lower than 720×480), and the like.

The quality calculator 632 obtains a probability for each of the resolutions for the input image, selects the resolution for which the probability that is finally predicted is the highest as a final resolution, and excludes the case for which the probability that is finally predicted is too low.

The quality calculator 632 may predict a noise level and a compression level in addition to the resolution.

Meanwhile, when calculating the compression level, the quality calculator 632 may determine the compression level based on the learning data obtained by lowering a compression bit-rate based on the original state.

For example, in the case of FHD, the quality calculator 632 may evaluate the current digital TV broadcasting standard as 1.0 level, and may also evaluate it as 0.0 level as data are lost due to heavy compression.

The quality calculator 632 may measure a level of flicker in an input image and may calculate a noise level.

For example, the quality calculator 632 may calculate a noise level in an input image as four steps including high, middle, low, and no noise.

Meanwhile, the quality calculator 632 may calculate a resolution and a noise level of a received image signal by using the deep neural network. Accordingly, the original image quality calculation of the received image signal may be performed accurately.

The quality calculator 632 may update a parameter for the deep neural network from the server 600 and may calculate a resolution and a noise level of a received image signal based on the updated parameter. Accordingly, the original image quality calculation of the image signal may be performed accurately based on learning.

The quality calculator 632 may extract a first region and a second region of an image signal, calculate a resolution of an original image signal based on the first region and calculate a noise level of the image signal based on the second region. Accordingly, based on the image extraction proper to the quality calculation, the original image quality calculation of the image signal may be performed accurately.

The quality calculator 632 may extract the region having the greatest edge components in an image signal as a first region and extract the region having the smallest edge components in an image signal as a second region. Accordingly, based on the image extraction proper to the quality calculation, the original image quality calculation of the image signal may be performed accurately.

The quality calculator 632 may control a noise reduction process strength to become greater as a calculated noise level is high. Accordingly, an image processing which is proper to a noise level of an image signal may be performed.

The quality calculator 632 may calculate a resolution, a noise level, and a compression level of a received original image signal and may calculate the compression level based on the learning data obtained by lowering a compression bit-rate.

The image quality processor 635 may control an enhancing process strength of an image signal to become smaller as a calculated compression level is high. Accordingly, a compression level calculation may be performed accurately.

The quality calculator 632 may control an enhancing process strength of an image signal to become greater as a resolution of an original image signal is high. Accordingly, an image processing which is proper to a resolution of the received original image signal may be performed.

The image quality processor 635 may control a blur process strength of an image signal to become greater as a calculated compression level is high. Accordingly, an image processing which is proper to a compression level of the received original image signal may be performed.

The image quality processor 635 may control a filter size for filtering an image signal to become smaller as a resolution of an original image signal is high. Accordingly, an image processing which is proper to a resolution of the received original image signal may be performed.

After down-scaling an image signal depending on a resolution of an original image signal, the image quality processor 635 may perform an image quality processing for the down-scaled image signal and may up-scaling the image signal to which the image quality processing is performed, and then, may output the up-scaled image signal. Accordingly, an image processing which is proper to a resolution of the received original image signal may be performed.

Meanwhile, the afterimage reducer 637 according to an embodiment of the present disclosure may calculate image accumulation information based on an input image, perform learning based on the image accumulation information, adjust an afterimage reduction strength based on learning, and perform an afterimage reduction process based on the afterimage reduction strength. Accordingly, an afterimage of the image display apparatus 100 including the organic light emitting diode panel 210 may be reduced. Furthermore, the lifespan of the image display apparatus 100 including an organic light emitting diode panel 210 may be increased.

Meanwhile, the afterimage reducer 637 according to an embodiment of the present disclosure may set an afterimage reduction level based on an afterimage reduction strength and perform an afterimage reduction process based on the afterimage reduction level. Accordingly, an afterimage of the image display apparatus 100 including the organic light emitting diode panel 210 may be reduced. Furthermore, the lifespan of the image display apparatus 100 including an organic light emitting diode panel 210 may be increased.

The detailed operation of the afterimage reducer 637 will be described below with reference to FIG. 12A and FIG. 12B.

Figure 10:
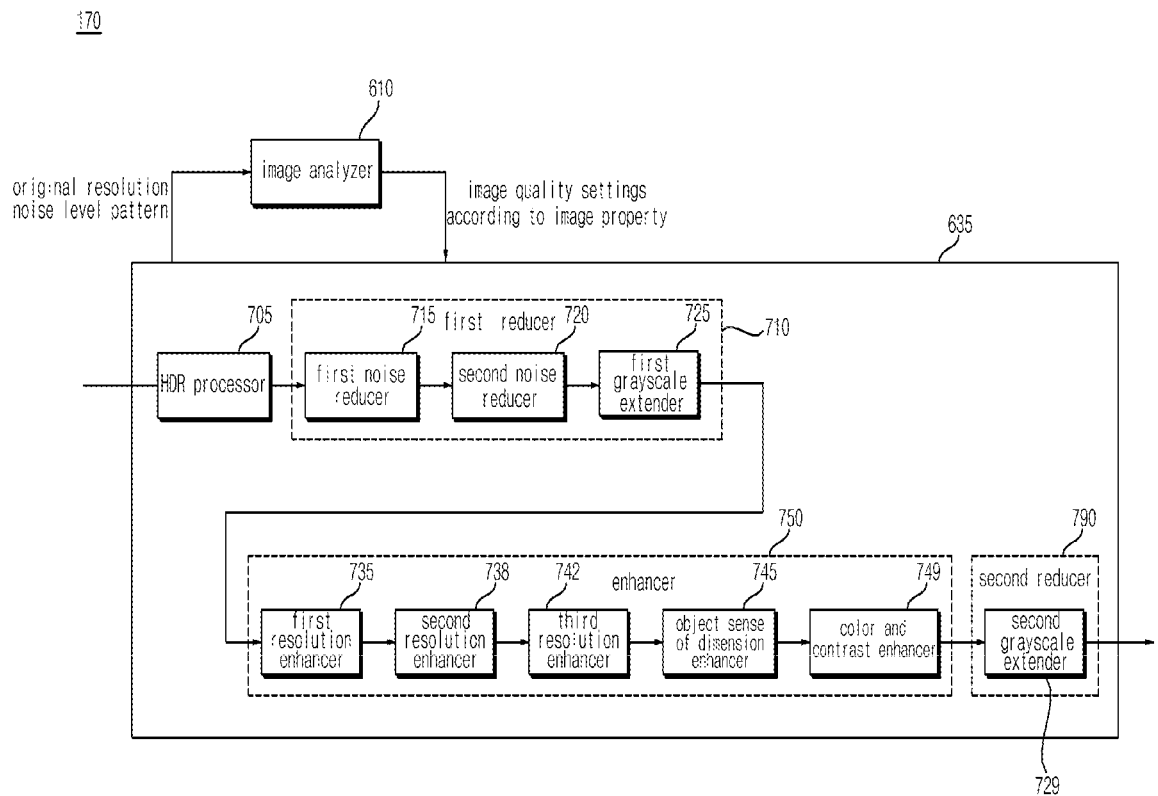
FIG. 10 is an internal block diagram of an example of the image quality processor shown in FIG. 9.

FIG. 10 is an internal block diagram of an example of the image quality processor shown in FIG. 9.

Referring to the drawing, the signal processing device 170 according to an embodiment of the present disclosure may include an image analyzer 610 and an image quality processor 635.

The image analyzer 610 may be provided with the quality calculator 632 and the image quality setter 634 shown in FIG. 9.

The image analyzer 610 may analyze an input image signal and output information related to the analyzed input image signal.

Meanwhile, the image analyzer 610 may distinguish an object region and a background region of a first input image signal which is input. Alternatively, the image analyzer 610 may calculate a probability or a ratio of the object region and the background region of the first input image signal which is input.

The input image signal may be an input image signal from the image receiver 105 or an image decoded in the image decoder 320.

Particularly, the image analyzer 610 may analyze the input image signal by using artificial intelligence (AI) and output the analyzed input image signal information.

Specifically, the image analyzer 610 may analyze a resolution, a grayscale, a noise level, a pattern, and the like and output information related to the analyzed input image signal, particularly image quality settings information to the image quality processor 635.

The image quality processor 635 may include an HDR processor 705, a first reducer 710, an enhancer 750, and a second reducer 790.

The HDR processor 705 may receive an image signal input and process a high dynamic range (HDR) processing with respect to the input image signal.

For example, the HDR processor 705 may convert a standard dynamic range (SDR) image signal to an HDR image signal.

For another example, the HDR processor 705 may receive an image signal input and process a resolution of grayscale for a high dynamic range (HDR) with respect to the input image signal.

Meanwhile, in the case that an input image signal is an SDR image signal, the HDR processor 705 may bypass a grayscale conversion, and in the case that an input image signal is an HDR image signal, the HDR processor 705 may perform a grayscale conversion. Accordingly, for an input image, the high grayscale expressiveness may be improved.

The HDR processor 705 may perform a grayscale conversion based on a first grayscale conversion mode in which a low grayscale is enhanced between the low gray scale and the high gray scale and a high grayscale is saturated or a second grayscale conversion mode in which the low gray scale and the high gray scale are entirely and uniformly converted.

Particularly, in the case that the first grayscale conversion mode is performed, the HDR processor 705 may perform a grayscale conversion based on the data that corresponds to the first grayscale conversion mode in a look-up table.

More particularly, in the case that the first grayscale conversion mode is performed, the HDR processor 705 may perform a grayscale conversion based on a calculation expression for input data and the data that corresponds to the first grayscale conversion mode in a look-up table which is determined by the calculation expression. Here, the input data may include video data and meta data.

Meanwhile, in the case that the second grayscale conversion mode is performed, the HDR processor 705 may perform a grayscale conversion based on the data that corresponds to the second grayscale conversion mode in a look-up table.

More particularly, in the case that the second grayscale conversion mode is performed, the HDR processor 705 may perform a grayscale conversion based on a calculation expression for input data and the data that corresponds to the second grayscale conversion mode in a look-up table which is determined by the calculation expression. Here, the input data may include video data and meta data.

Meanwhile, the HDR processor 705 may select the first grayscale conversion mode or the second grayscale conversion mode according to a third grayscale conversion mode or a fourth grayscale conversion mode in a high grayscale amplifier 851 in the second reducer 790.

For example, in the case that the third grayscale conversion mode is performed, the high grayscale amplifier 851 in the second reducer 790 may perform a grayscale conversion based on the data that corresponds to the third grayscale conversion mode in a look-up table.

Particularly, in the case that the third grayscale conversion mode is performed, the high grayscale amplifier 851 in the second reducer 790 may perform a grayscale conversion based on a calculation expression for input data and the data that corresponds to the third grayscale conversion mode in a look-up table which is determined by the calculation expression. Here, the input data may include video data and meta data.

Meanwhile, in the case that the fourth grayscale conversion mode is performed, the high grayscale amplifier 851 in the second reducer 790 may perform a grayscale conversion based on the data that corresponds to the fourth grayscale conversion mode in a look-up table.

Particularly, in the case that the fourth grayscale conversion mode is performed, the high grayscale amplifier 851 in the second reducer 790 may perform a grayscale conversion based on a calculation expression for input data and the data that corresponds to the fourth grayscale conversion mode in a look-up table which is determined by the calculation expression. Here, the input data may include video data and meta data.

For example, in the case that the fourth grayscale conversion mode is performed in the high grayscale amplifier 851 in the second reducer 790, the HDR processor 705 may perform the second grayscale conversion mode.

In another example, in the case that the third grayscale conversion mode is performed in the high grayscale amplifier 851 in the second reducer 790, the HDR processor 705 may perform the first grayscale conversion mode.

Alternatively, the high grayscale amplifier 851 in the second reducer 790 may vary the grayscale conversion mode, which is performed, according to the grayscale conversion mode in the HDR processor 705.

For example, in the case that the second grayscale conversion mode is performed in the HDR processor 705, the high grayscale amplifier 851 in the second reducer 790 may perform the fourth grayscale conversion mode.

In another example, in the case that the first grayscale conversion mode is performed in the HDR processor 705, the high grayscale amplifier 851 in the second reducer 790 may perform the third grayscale conversion mode.

The HDR processor 705 according to an embodiment of the present disclosure may perform the grayscale conversion mode such that a low grayscale and a high grayscale are uniformly converted.

Meanwhile, the second reducer 790 may perform the fourth grayscale conversion mode according to the second grayscale conversion mode in the HDR processor 705, and accordingly, may amplify an upper limit level of the grayscale of the input image signal. Accordingly, for an input image, the high grayscale expressiveness may be improved.

The first reducer 710 may perform a noise reduction for an input image signal or an image signal performed in the HDR processor 705.

Particularly, the first reducer 710 may perform the multi-stage noise reduction process and a first stage grayscale extension process for an input image signal or an HDR image from the HDR processor 705.

For this, the first reducer 710 may include a plurality of noise reducers 715 and 720 for the multi-stage noise reduction and a grayscale extender 725 for the grayscale extension.

The enhancer 750 may perform the multi-stage image resolution enhancement process for the image from the first reducer 710.

In addition, the enhancer 750 may perform the object sense of dimension enhancement process. Furthermore, the enhancer 750 may perform the color or contrast enhancement process.

For this, the enhancer 750 may include a plurality of resolution enhancers 735, 738, and 742 for the image resolution enhancement in multi-stage, an object sense of dimension enhancer 745 for the object sense of dimension enhancement, and a color and contrast enhancer 749 for the color or contrast enhancement.

The second reducer 790 may perform a two-stage grayscale extension process based on the image signal in which the noise input from the first reducer 710 is removed.

The second reducer 790 may amplify an upper limit level of the grayscale of an input signal and may extend a resolution of high grayscale of the input signal. Accordingly, for an input image, the high grayscale expressiveness may be improved.

For example, the second reducer 790 may perform a grayscale extension uniformly throughout the entire grayscale regions of an input signal. Accordingly, the uniform grayscale extension may be performed for the regions of the input image, and the high grayscale expressiveness may be improved.

The second reducer 790 may perform the grayscale amplification and extension based on the input signal from the first grayscale extender 725. Accordingly, for an input image, the high grayscale expressiveness may be improved.

In the case that an input image signal is an SDR image signal, the second reducer 790 may vary a degree of amplification based on a user input signal. Accordingly, in response to a user settings, the high grayscale expressiveness may be improved.

Meanwhile, in the case that an input image signal is an HDR image signal, the second reducer 790 may perform amplification according to a settings value. Accordingly, for an input image, the high grayscale expressiveness may be improved.

In the case that an input image signal is an HDR image signal, the second reducer 790 may vary a degree of amplification based on a user input signal. Accordingly, in response to a user settings, the high grayscale expressiveness may be improved.

Meanwhile, the second reducer 790 may vary a degree of grayscale extension in performing the grayscale extension based on a user input signal. Accordingly, in response to a user settings, the high grayscale expressiveness may be improved.

The second reducer 790 may amplify an upper limit level of the grayscale according to the grayscale conversion mode in the HDR processor 705. Accordingly, for an input image, the high grayscale expressiveness may be improved.

The signal processing device 170 includes the HDR processor 705 for receiving an image signal input and adjusting brightness of the input image signal and the reducer 790 for amplifying the brightness of the image signal from the HDR processor 705 and generating an enhanced image signal by increasing the grayscale resolution of the image signal. The enhanced image signal provides the enhanced brightness and the grayscale resolution of the image signal while high dynamic range in a displayed HDR image is maintained.

The brightness range of the image signal is controlled by a control signal received from the signal processing device 170.

Meanwhile, the image analyzer may be further included, which determines whether an input image signal is an HDR signal or an SDR signal and generates a control signal to be provided to the HDR processor 705. The control signal controls the HDR processor 705 only in the case that the input image signal is the HDR signal.

The control signal is received from the controller of the image display apparatus associated with the signal processing and corresponds to the settings of the image display apparatus.

Meanwhile, the resolution of grayscale is increased based on the amplification of the controlled brightness of the image signal.

The resolution of grayscale is increased based on the control signal input to the signal processing device 170.

The control signal is received from the controller of the image display apparatus associated with the signal processing and corresponds to the settings of the image display apparatus.

Meanwhile, the reducer 790 may include the high grayscale amplifier 851 for amplifying an upper limit level of the grayscale of an input signal and de-contour units 842 and 844 for extending a resolution of the grayscale which is amplified from the high grayscale amplifier 851.

The second reducer 790 may include a second grayscale extender 729 for a two-stage grayscale extension.

Meanwhile, the image quality processor 635 in the signal processing device 170 according to the present disclosure performs a four-stage reduction process and a four-stage image enhancement process as shown in FIG. 10.

Here, the four-stage reduction process may include a two-stage noise reduction process and a two-stage grayscale extension process.

The two-stage noise reduction process may be performed by the first and second noise reducers 715 and 720 in the first reducer 710, and the two-stage grayscale extension process may be performed by the first grayscale extender 725 in the first reducer 710 and the second grayscale extender 725 in the second reducer 790.

Meanwhile, the four-stage image enhancement process may include a three-stage image resolution (bit resolution) enhancement process and the object sense of dimension enhancement process.

Here, the three-stage image resolution process is performed by the first to third resolution enhancers 735, 738, and 742, and the object sense of dimension enhancement process may be performed by the object sense of dimension enhancer 745.

The signal processing device 170 according to the present disclosure may enhance the image quality gradually by applying the same or similar algorithm as the multi-stage image quality process.

For this, the image quality processor 635 in the signal processing device 170 according to the present disclosure may apply the same or similar algorithm two times or more and perform the image quality enhancement process.

The same or similar algorithm performed in the image quality processor 635 has different objects to attain in the respective stages and has an advantage that smaller artifact occurs by performing the multi-stage image quality enhancement process gradually in comparison with the single-stage image quality enhancement process, and has an advantage that more natural and fine image process result may be obtained.

In addition, the same or similar algorithm is alternately applied with the other image quality processing algorithm in multi-stage, and there is an effect of more than simple consecutive processing stages.

The signal processing device 170 according to the present disclosure may perform the noise reduction process in multi-stage manner. The noise reduction process in each stage may include a temporal process and a spatial process.

To calculate the original image quality of an image signal, in the present disclosure, the latest technology such as the artificial intelligence may be used. For this, the deep neural network may be used.

The quality calculator 632 calculates a resolution and a noise level of a received image signal by using the deep neural network.

The quality calculator 632 or the quality calculator 670 may obtain a learning image per original image resolution and compression level and learn a network for improving an accuracy.

The image used for learning may include various images as general images which may be experienced in daily broadcasting programs and may cover the entire input environment.

The quality calculator 632 may perform learning by utilizing a Convolutional Neural Network, Mobile-Net, and the like, which are low-level for the purpose of saving time or cost which is required for detection.

For example, the quality calculator 632 may analyze only a partial region (e.g., 224×224, 128×128, or 64×64) of the entire regions.

The quality calculator 632 may select a proper detection region in accordance with the detection purpose.

For example, when detecting an original image resolution, the quality calculator 632 may select a first region having the greatest edge components and select a second region having the smallest edge components.

Particularly, the quality calculator 632 may apply the algorithm for selecting a detection region quickly for the purpose of improving a processing speed.

For example, the quality calculator 632 may perform a preprocessing task such as Fast Fourier Transform (FFT) in a detection region for the purpose of improving a detection accuracy.

Figure 11A:
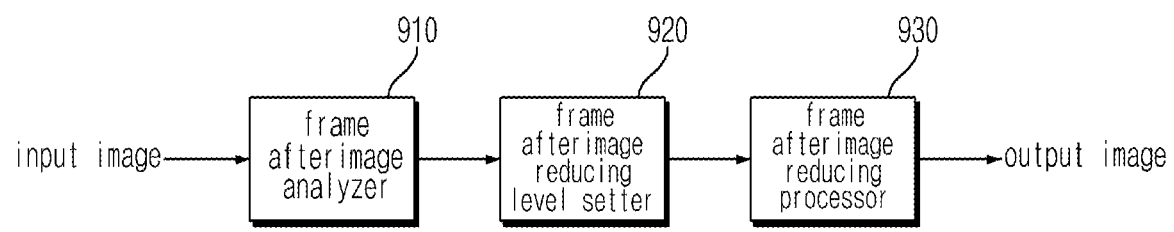
FIGS. 11A and 11B are internal block diagrams of an example of the afterimage reducer.
Figure 11B:
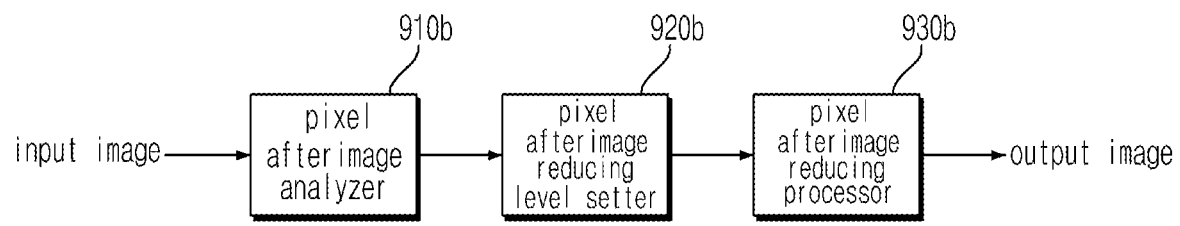

FIGS. 11A and 11B are internal block diagrams of an example of the afterimage reducer.

First, FIG. 11A is a diagram that is referenced by the operation description of the afterimage reducer in a frame unit.

Referring to the drawing, for a processing in a frame unit, the afterimage reducer 637 may include an afterimage analyzer 910 to calculate image accumulation information based on an input image, an afterimage reducing level setter 920 to set an afterimage reducing level based on the image accumulation information, and an afterimage reducing processor 930 to perform an afterimage reducing process based on the afterimage reducing level.

FIG. 11B is a diagram that is referenced by the operation description of the afterimage reducer in a pixel unit.

Referring to the drawing, for a processing in a pixel unit, the afterimage reducer 637 may include an afterimage analyzer 910b to calculate image accumulation information based on an input image, an afterimage reducing level setter 920b to set an afterimage reducing level based on the image accumulation information, and an afterimage reducing processor 930b to perform an afterimage reducing process based on the afterimage reducing level.

For the afterimage reduction, in the present disclosure, the afterimage reduction technique based on the artificial intelligence is utilized.

Figure 12A:
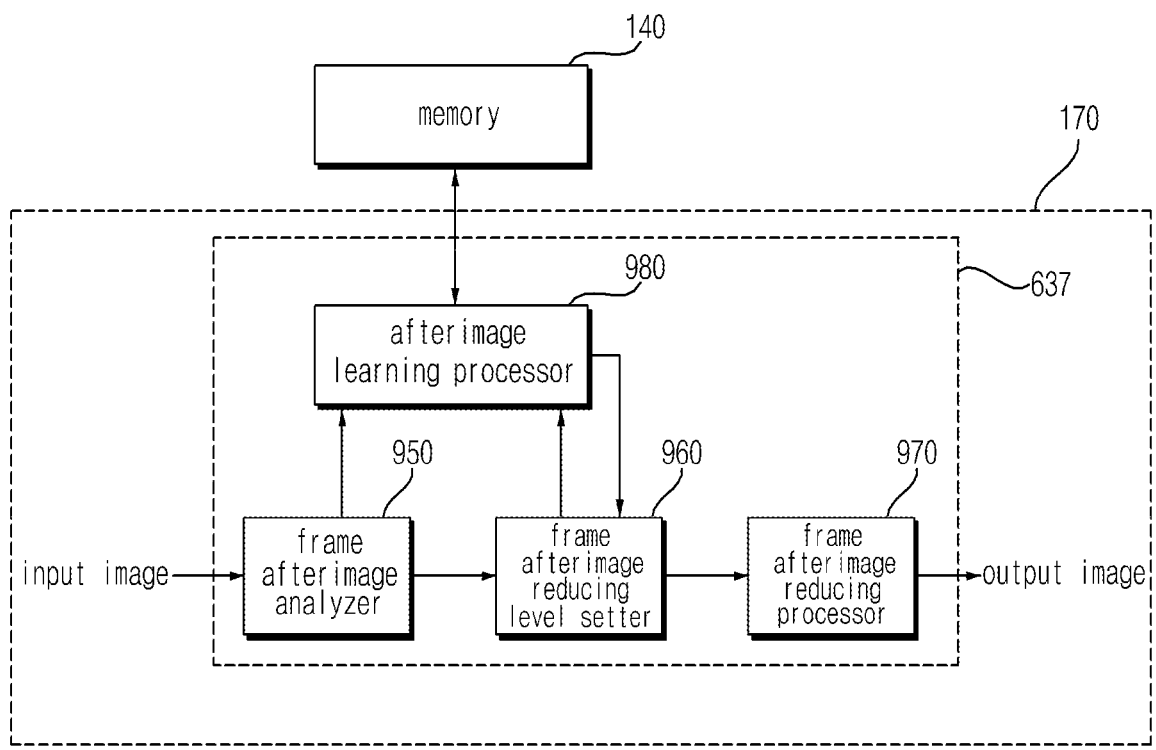
FIGS. 12A and 12B are internal block diagrams of an example of the afterimage reducer according to an embodiment of the present disclosure.
Figure 12B:
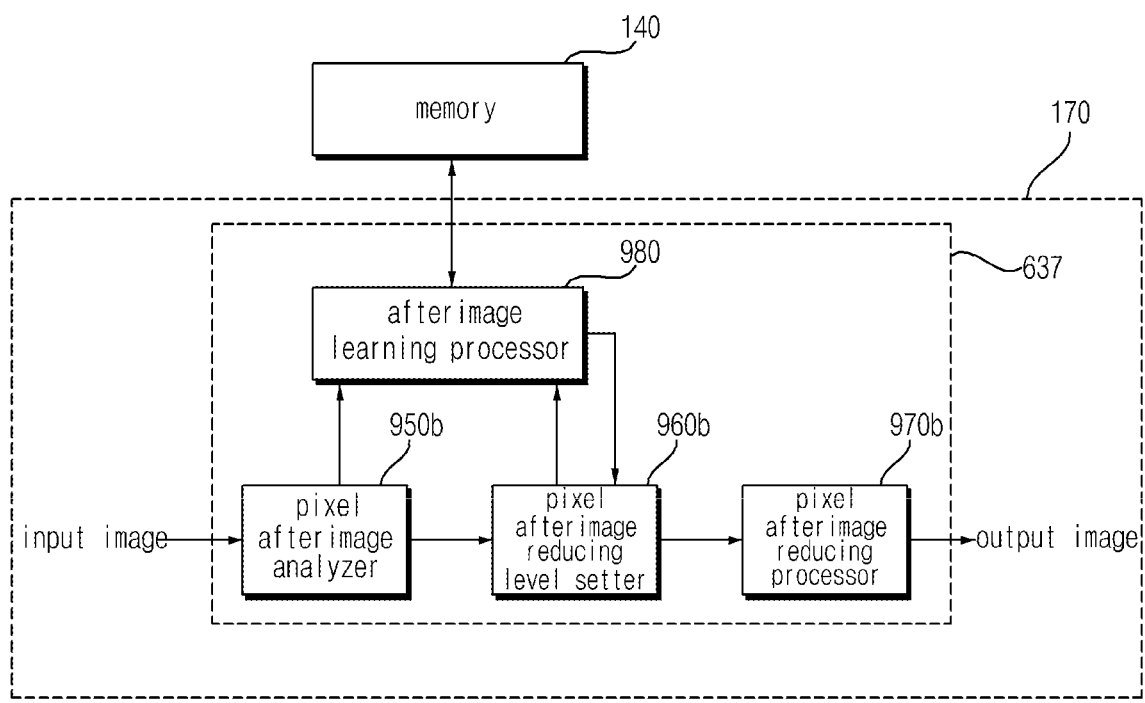

For this, as shown in FIG. 12A or FIG. 12B, the present disclosure may further include an afterimage learning processor 980 of a frame unit and an afterimage learning processor 980b of a pixel unit or a predefined region unit.

FIGS. 12A and 12B are internal block diagrams of an example of the afterimage reducer according to an embodiment of the present disclosure.

First, FIG. 12A is an internal block diagram of an example of the afterimage reducer in a frame unit.

Referring to the drawing, the afterimage reducer 637 in a frame unit includes an afterimage analyzer 950 to calculate image accumulation information based on an input image, an afterimage learning processor 980 to perform learning based on the image accumulation information and adjust an afterimage reducing strength based on learning, and an afterimage reducing processor 970 to perform an afterimage reducing process based on the afterimage reducing strength from the afterimage learning processor 980. Accordingly, an afterimage of the image display apparatus 100 including the organic light emitting diode panel 210 may be reduced. Furthermore, the lifespan of the image display apparatus 100 including an organic light emitting diode panel 210 may be increased.

The afterimage reducer 637 in a frame unit may further include an afterimage reducing level setter 960 to set an afterimage reducing level based on the afterimage reducing strength from the afterimage learning processor 980. Accordingly, an afterimage of the image display apparatus 100 including the organic light emitting diode panel 210 may be reduced.

The afterimage reducing processor 970 in a frame unit may perform the afterimage reducing process based on the afterimage reducing level from the afterimage reducing level setter 960. Accordingly, an afterimage of the image display apparatus 100 including the organic light emitting diode panel 210 may be reduced, and consequently, the lifespan of the image display apparatus 100 may be increased.

In the case that the image accumulation information has a reference size or greater, the afterimage learning processor 980 in a frame unit may increase the afterimage reducing strength from a first level to a second level. Accordingly, an afterimage of the image display apparatus 100 including the organic light emitting diode panel 210 may be efficiently reduced.

The afterimage learning processor 980 in a frame unit may further adjust the afterimage reducing strength based on a frequency of the image accumulation. Accordingly, an afterimage of the image display apparatus 100 including the organic light emitting diode panel 210 may be efficiently reduced.

In the case that the frequency of the image accumulation is a first time or more, the afterimage learning processor 980 in a frame unit may increase the afterimage reducing strength from a first level to a third level. Accordingly, an afterimage of the image display apparatus 100 including the organic light emitting diode panel 210 may be efficiently reduced.

The afterimage learning processor 980 in a frame unit may control to store the image accumulation information or the afterimage reducing strength in an external nonvolatile memory 140. Accordingly, the image accumulation information or the afterimage reducing strength may be stably managed.

Meanwhile, in response to the power being turned on, the afterimage learning processor 980 in a frame unit may receive the image accumulation information or the afterimage reducing strength from the external nonvolatile memory 140, and in response to the power being turned off, the afterimage learning processor 980 may transmit the image accumulation information or the afterimage reducing strength to the external nonvolatile memory 140. Accordingly, the image accumulation information or the afterimage reducing strength may be stably managed and may be calculated accurately.

The afterimage learning processor 980 in a frame unit may perform learning based on the image accumulation information based on the deep neural network and may adjust the afterimage reducing strength based on the learning. Accordingly, an afterimage of the image display apparatus 100 including the organic light emitting diode panel 210 may be efficiently reduced.

Meanwhile, in the case that the afterimage processing operation is performed in the afterimage reducing processor, the afterimage learning processor 980 in a frame unit may reset the image accumulation information or control a level of the image accumulation information to be a predetermined value or less. Accordingly, an afterimage of the image display apparatus 100 including the organic light emitting diode panel 210 may be efficiently reduced.

The afterimage analyzer 950 in a frame unit may accumulate at least one of a pixel current, a brightness level, or a saturation level based on an input image. Accordingly, various types of image accumulation information may be calculated, and an afterimage of the image display apparatus 100 may be efficiently reduced.

Meanwhile, the afterimage reducing processor 970 in a frame unit may output a second brightness level lower than a first brightness level, which is an input brightness, for a region for which the afterimage reducing process is required, based on a first afterimage reducing strength. Accordingly, an afterimage of the image display apparatus 100 including the organic light emitting diode panel 210 may be efficiently reduced.

The afterimage reducing processor 970 in a frame unit may output a third brightness level lower than a first brightness level, which is an input brightness, and lower than a second brightness level for a region for which the afterimage reducing process is required, based on a second afterimage reducing strength higher than a first afterimage reducing strength. Accordingly, an afterimage of the image display apparatus 100 including the organic light emitting diode panel 210 may be efficiently reduced.

The afterimage analyzer 950, the afterimage learning processor 980, and the afterimage reducing processor 970 shown in FIG. 12A may be operated in a frame unit. Accordingly, an afterimage of the image display apparatus 100 including the organic light emitting diode panel 210 may be efficiently reduced.

Next, FIG. 12B is an internal block diagram of an example of the afterimage reducer in a pixel unit or a predefined region unit.

Referring to the drawing, the afterimage reducer 637 in a pixel unit or a predefined region unit includes a second afterimage analyzer 950*b* to calculate image accumulation information based on an input image, a second afterimage learning processor 980*b* to perform learning based on the image accumulation information and adjust an afterimage reducing strength based on learning, and a second afterimage reducing processor 970*b* to perform an afterimage reducing process based on the afterimage reducing strength from the afterimage learning processor 980. Accordingly, an afterimage of the image display apparatus 100 including the organic light emitting diode panel 210 may be reduced. Furthermore, the lifespan of the image display apparatus 100 including an organic light emitting diode panel 210 may be increased.

The afterimage reducer 637 in a pixel unit or a predefined region unit may further include a second afterimage reducing level setter 960*b* to set an afterimage reducing level based on the afterimage reducing strength from the second afterimage learning processor 980*b*. Accordingly, an afterimage of the image display apparatus 100 including the organic light emitting diode panel 210 may be reduced.

The second afterimage reducing processor 970*b* in a pixel unit or a predefined region unit may perform the afterimage reducing process based on the afterimage reducing level from the afterimage reducing level setter 960*b*. Accordingly, an afterimage of the image display apparatus 100 including the organic light emitting diode panel 210 may be reduced, and consequently, the lifespan of the image display apparatus 100 may be increased.

In the case that the image accumulation information has a reference size or greater, the second afterimage learning processor 980*b* in a pixel unit or a predefined region unit may increase the afterimage reducing strength from a first level to a second level. Accordingly, an afterimage of the image display apparatus 100 including the organic light emitting diode panel 210 may be efficiently reduced.

The second afterimage learning processor 980*b* in a pixel unit or a predefined region unit may further adjust the afterimage reducing strength based on a frequency of the image accumulation. Accordingly, an afterimage of the image display apparatus 100 including the organic light emitting diode panel 210 may be efficiently reduced.

In the case that the frequency of the image accumulation is a first time or more, the second afterimage learning processor 980*b* in a pixel unit or a predefined region unit may increase the afterimage reducing strength from a first level to a third level. Accordingly, an afterimage of the image display apparatus 100 including the organic light emitting diode panel 210 may be efficiently reduced.

The second afterimage learning processor 980*b* in a pixel unit or a predefined region unit may control to store the image accumulation information or the afterimage reducing strength in an external nonvolatile memory 140. Accordingly, the image accumulation information or the afterimage reducing strength may be stably managed.

Meanwhile, in response to the power being turned on, the second afterimage learning processor 980*b* in a pixel unit or a predefined region unit may receive the image accumulation information or the afterimage reducing strength from the external nonvolatile memory 140, and in response to the power being turned off, the afterimage learning processor 980 may transmit the image accumulation information or the afterimage reducing strength to the external nonvolatile memory 140. Accordingly, the image accumulation information or the afterimage reducing strength may be stably managed and may be calculated accurately.

The second afterimage learning processor 980*b* in a pixel unit or a predefined region unit may perform learning based on the image accumulation information based on the deep neural network and may adjust the afterimage reducing strength based on the learning. Accordingly, an afterimage of the image display apparatus 100 including the organic light emitting diode panel 210 may be efficiently reduced.

Meanwhile, in the case that the afterimage processing operation is performed in the afterimage reducing processor, the second afterimage learning processor 980*b* in a pixel unit or a predefined region unit may reset the image accumulation information or control a level of the image accumulation information to be a predetermined value or less. Accordingly, an afterimage of the image display apparatus 100 including the organic light emitting diode panel 210 may be efficiently reduced.

The second afterimage analyzer 950*b* in a pixel unit or a predefined region unit may accumulate at least one of a pixel current, a brightness level, or a saturation level based on an input image. Accordingly, various types of image accumulation information may be calculated, and an afterimage of the image display apparatus 100 may be efficiently reduced.

Meanwhile, the second afterimage reducing processor 970*b* in a pixel unit or a predefined region unit may output a second brightness level lower than a first brightness level, which is an input brightness, for a region for which the afterimage reducing process is required, based on a first afterimage reducing strength. Accordingly, an afterimage of the image display apparatus 100 including the organic light emitting diode panel 210 may be efficiently reduced.

The second afterimage reducing processor 970*b* in a pixel unit or a predefined region unit may output a third brightness level lower than a first brightness level, which is an input brightness, and lower than a second brightness level for a region for which the afterimage reducing process is required, based on a second afterimage reducing strength higher than a first afterimage reducing strength. Accordingly, an afterimage of the image display apparatus 100 including the organic light emitting diode panel 210 may be efficiently reduced.

The second afterimage analyzer 950*b*, the second afterimage learning processor 980*b*, and the second afterimage reducing processor 970*b* shown in FIG. 12B may be operated in a pixel unit or a predefined region unit. Accordingly, an afterimage of the image display apparatus 100 including the organic light emitting diode panel 210 may be efficiently reduced.

The second afterimage reducing processor 970*b* shown in FIG. 12B may change contrast for decreasing a difference between a detection region in which a level of accumulated current is a reference value or more and a neighboring region. Accordingly, the contrast difference due to the brightness fall occurred around the detection region may be reduced.

More particularly, the second afterimage reducing processor 970*b* shown in FIG. 12B may reduce a contrast difference between a neighboring region of a detection region and the detection region based on a gain that corresponds to accumulated current in a pixel unit. Accordingly, the contrast difference due to the brightness fall near the detection region may be reduced. Furthermore, the dark phenomenon that may occur around the detection region may be prevented.

Meanwhile, in the case that a level of accumulated current is a reference value or more, the afterimage reducing processor 970 shown in FIG. 12A or the afterimage reducing processor 970*b* shown in FIG. 12B may detect the corresponding region as a detection region or an afterimage processing region and may output a brightness level which is lower than the brightness level of the input image. Accordingly, the lifespan of an image display apparatus including an organic light emitting diode panel may be increased.

According to such a method, it may be possible to detect a translucent logo region, which is originally difficult to be detected, as a detection region using a logo detection method, and thus, an operation of reducing an afterimage may be widely and accurately performed, thereby increasing the lifespan of the image display apparatus. A brightness level in units of pixels in a detection region may be lowered, and thus, the brightness of the entire image may be enhanced compared with the prior art.

Meanwhile, the afterimage reducing processor 970 shown in FIG. 12A or the afterimage reducing processor 970*b* shown in FIG. 12B may vary the brightness and contrast of a detection region of the input image based on a gain in a gain map. Thus, the lifespan of an image display apparatus of an organic light emitting diode panel may be increased. Particularly, a translucent logo region may be detected and an operation of reducing an afterimage may be performed, thereby increasing the lifespan of an image display apparatus.

The afterimage reducing processor 970 shown in FIG. 12A or the afterimage reducing processor 970*b* shown in FIG. 12B may vary the brightness and contrast of a detection region of an input image in inverse proportion to the gain of the gain map. Accordingly, the lifespan of the image display apparatus including the organic light emitting diode panel may be increased. Particularly, a translucent logo region may be detected and an operation of reducing an afterimage may be performed, thereby increasing the lifespan of an image display apparatus.

The afterimage reducing processor 970 shown in FIG. 12A or the afterimage reducing processor 970*b* shown in FIG. 12B may vary the brightness of a detection region of the input image in inverse proportion to the gain of the gain map.

Particularly, the afterimage reducing processor 970 shown in FIG. 12A or the afterimage reducing processor 970*b* shown in FIG. 12B may output brightness data of a lower second level than a brightness level of a detection region of the input image based on the gain of the gain map.

Thus, the lifespan of an image display apparatus including an organic light emitting diode panel may be increased.

Particularly, a translucent logo region may be detected and an operation of reducing an afterimage may be performed, thereby increasing the lifespan of the image display apparatus.

The contrast reducer 1510 may vary contrast to reduce a difference from a surrounding region of the detection region. Accordingly, the contrast difference due to reduction in brightness around the detection region may be lowered.

The afterimage reducing processor 970 shown in FIG. 12A or the afterimage reducing processor 970b shown in FIG. 12B may reduce a contrast difference between a detection region and a surrounding region around based on a gain corresponding to accumulated pixel current. Accordingly, the contrast difference due to reduction in brightness around the detection region may be lowered.

The brightness reducer 1520 in the afterimage reducing processor 970 shown in FIG. 12A or the afterimage reducing processor 970b shown in FIG. 12B may control such that a brightness of a neighboring region of a detection region becomes lowered in comparison with an input image. the lifespan of an image display apparatus of an organic light emitting diode panel may be increased. Particularly, a translucent logo region may be detected and an operation of reducing an afterimage may be performed, thereby increasing the lifespan of an image display apparatus.

The afterimage reducing processor 970 shown in FIG. 12A or the afterimage reducing processor 970b shown in FIG. 12B may perform a contrast reduction first, and thereafter, may perform a brightness reduction based on the brightness data in which contrast is reduced, the data of an input image, and the gain from the gain map.

Figure 13A:
FIGS. 13A to 13C are diagrams that are referenced by the description of the afterimage processing operation.
Figure 13B:
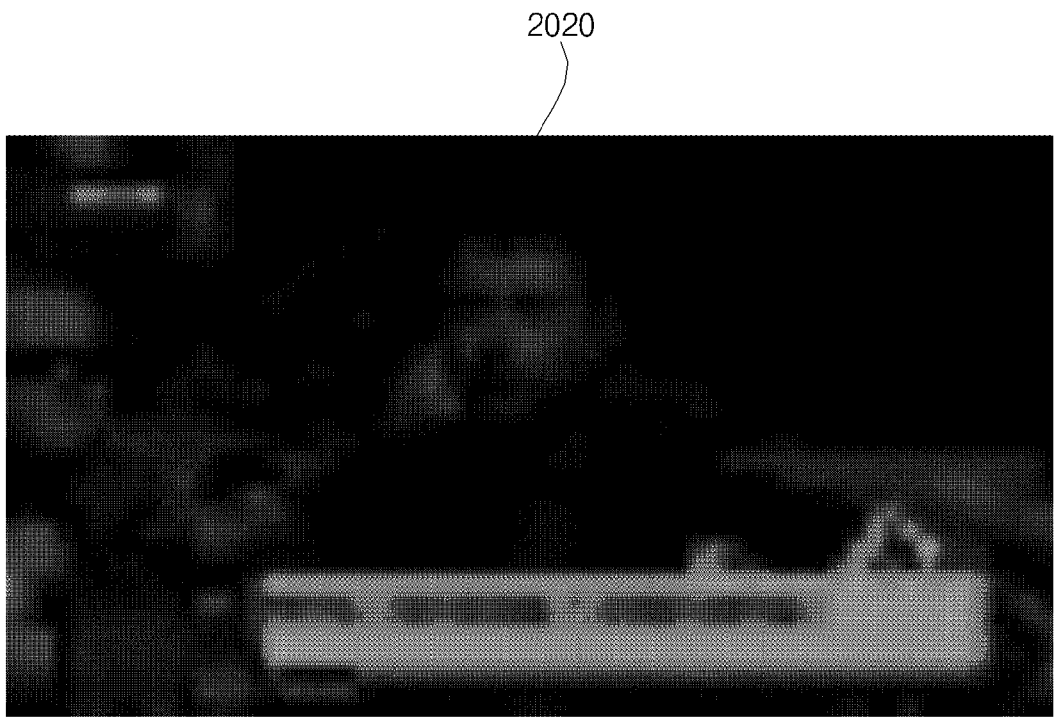
Figure 13C:

FIGS. 13A to 13C are diagrams that are referenced by the description of the afterimage processing operation.

First, FIG. 13A is diagram showing an example of an image 2010 including a text region 2015.

According to the method for reducing the afterimage according to an embodiment of the present disclosure described with reference to FIG. 12A and FIG. 12B, a gain map 2020 as shown in FIG. 13B may be generated, and afterimage processing may be performed based on a gain for each pixel of the gain map 2020, and thus, as shown in FIG. 13C, an image 2030 including a text region 2035 may be output.

It may be seen that, compared with FIG. 13A, brightness reduction processing, contrast reducing processing, or the like may be performed on the text region 2035 of the image 2030 of FIG. 13C, and thus, the brightness thereof may be maintained, and simultaneously, contrast may be reduced. In addition, the afterimage of the corresponding region 2035 may be reduced through processing for preventing afterimage reduction.

While the present disclosure has been particularly shown and described with reference to exemplary embodiments thereof, it is clearly understood that the present disclosure is not limited to the specific embodiment described above, and various modifications are available to those ordinary skilled in the art without departing from the subject matter claimed in the accompanying claims. Further, the various modifications should not be individually understood from the technical concept or prospect of the present disclosure.

What is claimed is:

1. A signal processing device comprising:
an afterimage analyzer to calculate image accumulation information based on an input image;
an afterimage learning processor to perform learning based on the image accumulation information and adjust an afterimage reducing strength based on the learning; and
an afterimage reducing processor to perform an afterimage reducing process based on the afterimage reducing strength from the afterimage learning processor,
wherein the afterimage learning processor is configured to store the image accumulation information or the afterimage reducing strength in an external nonvolatile memory,
wherein in response to power being turned on, the afterimage learning processor is configured to receive the image accumulation information or the afterimage reducing strength from the external nonvolatile memory, and
wherein in response to the power being turned off, the afterimage learning processor is configured to transmit the image accumulation information or the afterimage reducing strength to the external nonvolatile memory.

2. The signal processing device of claim 1, further comprising an afterimage reducing level setter to set an afterimage reducing level based on the afterimage reducing strength from the afterimage learning processor,
wherein the afterimage reducing processor is configured to perform the afterimage reducing process based on the afterimage reducing level from the afterimage reducing level setter.

3. The signal processing device of claim 1, wherein the afterimage learning processor is configured to increase the afterimage reducing strength from a first level to a second level based on the image accumulation information being a reference size or greater.

4. The signal processing device of claim 1, wherein the afterimage learning processor further is configured to adjust the afterimage reducing strength based on a frequency of image accumulation.

5. The signal processing device of claim 4, wherein the afterimage learning processor is configured to increase the afterimage reducing strength from one level to another level based on the frequency of the image accumulation being a first time or more.

6. The signal processing device of claim 1, wherein the afterimage learning processor is configured to perform the learning based on the image accumulation information based on a deep neural network and adjust the afterimage reducing strength based on the learning.

7. The signal processing device of claim 1, wherein the afterimage learning processor is configured to reset the image accumulation information or control a level of the image accumulation information to be at a predetermined value or less based on the afterimage processing operation being performed in the afterimage reducing processor.

8. The signal processing device of claim 1, wherein the afterimage analyzer is configured to accumulate at least one of a pixel current, a brightness level, or a saturation level based on the input image.

9. The signal processing device of claim 1, wherein the afterimage reducing processor is configured to output a second brightness level lower than a first brightness level, which is an input brightness, for a region for which an afterimage reducing process is required, based on a first afterimage reducing strength.

10. The signal processing device of claim 9, wherein the afterimage reducing processor is configured to output a third brightness level lower than the first brightness level, which is an input brightness, and lower than the second brightness 11. The signal processing device of claim 1, wherein the afterimage analyzer, the afterimage learning processor, and the afterimage reducing processor are operated in a frame unit.

12. The signal processing device of claim 1, wherein the afterimage analyzer, the afterimage learning processor, and the afterimage reducing processor are operated in a pixel unit or a predefined region unit.

13. The signal processing device of claim 1, further comprising:
- a second afterimage analyzer to calculate image accumulation information based on an input image;
- a second afterimage learning processor to perform learning based on the image accumulation information and adjust an afterimage reducing strength based on learning; and
- a second afterimage reducing processor to perform an afterimage reducing process based on the afterimage reducing strength from the afterimage learning processor.

14. An image display apparatus comprising:
the signal processing device of claim 1 and configured to process signals and output images based on the signals; and
a display configured to display the images.

15. A signal processing device comprising:
an afterimage analyzer to calculate image accumulation information based on an input image;

level for a region for which the afterimage reducing process is required, based on a second afterimage reducing strength higher than the first afterimage reducing strength.

an afterimage learning processor to perform learning based on the image accumulation information and adjust an afterimage reducing strength based on the learning; and
an afterimage reducing processor to perform an afterimage reducing process based on the afterimage reducing strength from the afterimage learning processor,
wherein the afterimage learning processor is configured to perform the learning based on the image accumulation information based on a deep neural network and adjust the afterimage reducing strength based on the learning.

16. A signal processing device comprising:
an afterimage analyzer to calculate image accumulation information based on an input image;
an afterimage learning processor to perform learning based on the image accumulation information and adjust an afterimage reducing strength based on the learning;
an afterimage reducing processor to perform an afterimage reducing process based on the afterimage reducing strength from the afterimage learning processor;
a second afterimage analyzer to calculate image accumulation information based on an input image;
a second afterimage learning processor to perform learning based on the image accumulation information and adjust an afterimage reducing strength based on learning; and
a second afterimage reducing processor to perform an afterimage reducing process based on the afterimage reducing strength from the afterimage learning processor.

* * * * *